US009953097B2

(12) United States Patent
Pritchett et al.

(10) Patent No.: US 9,953,097 B2
(45) Date of Patent: Apr. 24, 2018

(54) SYSTEM AND METHOD FOR MANAGING NETWORK TRAFFIC ROUTING

(75) Inventors: Dan L. Pritchett, San Jose, CA (US); Ian Flint, Cupertino, CA (US); Connie Y. Yang, Saratoga, CA (US)

(73) Assignee: eBay Inc., San Jose, CA (US)

( * ) Notice: Subject to any disclaimer, the term of this patent is extended or adjusted under 35 U.S.C. 154(b) by 987 days.

(21) Appl. No.: 11/687,518

(22) Filed: Mar. 16, 2007

(65) Prior Publication Data
US 2008/0027947 A1    Jan. 31, 2008

Related U.S. Application Data

(60) Provisional application No. 60/743,506, filed on Mar. 16, 2006.

(51) Int. Cl.
| G06F 17/30 | (2006.01) |
| H04W 4/02 | (2018.01) |
| H04L 29/08 | (2006.01) |
| H04L 29/12 | (2006.01) |

(52) U.S. Cl.
CPC .... *G06F 17/30887* (2013.01); *H04L 67/1002* (2013.01); *H04L 67/1021* (2013.01); *H04L 67/18* (2013.01); *H04W 4/02* (2013.01); *H04L 29/12594* (2013.01); *H04L 29/12783* (2013.01); *H04L 61/30* (2013.01); *H04L 61/35* (2013.01)

(58) Field of Classification Search
USPC .............................. 707/3; 709/240
See application file for complete search history.

(56) References Cited

U.S. PATENT DOCUMENTS

| 6,278,935 | B1 * | 8/2001 | Kaplan et al. ................ 705/13 |
| 6,295,528 | B1 * | 9/2001 | Marcus et al. ............... 707/759 |
| 6,609,005 | B1 * | 8/2003 | Chern ........................... 455/457 |
| 6,643,640 | B1 * | 11/2003 | Getchius et al. ................ 707/3 |
| 6,684,250 | B2 * | 1/2004 | Anderson et al. ............ 709/225 |
| 6,757,740 | B1 * | 6/2004 | Parekh et al. ................ 709/245 |
| 6,970,864 | B2 * | 11/2005 | Marcus et al. ......... 707/999.003 |
| 7,072,963 | B2 * | 7/2006 | Anderson et al. ............ 709/225 |
| 7,136,875 | B2 * | 11/2006 | Anderson et al. ..... 707/999.104 |
| 7,562,076 | B2 * | 7/2009 | Kapur .................... 707/999.003 |
| 2002/0019820 | A1 * | 2/2002 | Marcus et al. ..................... 707/5 |
| 2004/0107220 | A1 * | 6/2004 | Natesan et al. ............ 707/104.1 |
| 2005/0021853 | A1 * | 1/2005 | Parekh et al. ................ 709/245 |
| 2005/0234922 | A1 * | 10/2005 | Parekh et al. .................. 707/10 |
| 2006/0178140 | A1 * | 8/2006 | Smith et al. .................. 455/427 |
| 2009/0171938 | A1 * | 7/2009 | Levin et al. ...................... 707/5 |

OTHER PUBLICATIONS

Chen, Y., Suel, T., and Markowetz, A. 2006. Efficient query processing in geographic web search engines. In Proceedings of the 2006 ACM SIGMOD international Conference on Management of Data (Chicago, IL, USA, Jun. 27-29, 2006). SIGMOD '06. ACM, New York, NY, 277-288.*
http://www.citrix.com/English/ps2/products/subfeature.asp?contentID=2300451, retrived Jun. 19, 2010.*

* cited by examiner

*Primary Examiner* — Jeffrey R Swearingen
(74) *Attorney, Agent, or Firm* — Schwegman Lundberg & Woessner, P.A.

(57) ABSTRACT

A method and system receives at a server a search request and processes the search request to determine a context of the search request, then determines, based on the context, a network route to an application server having the closest geographic proximity, with respect to the server, to the most relevant database associated with the context.

20 Claims, 24 Drawing Sheets

FIG. 17

SYSTEM AND METHOD FOR MANAGING NETWORK TRAFFIC ROUTING

RELATED APPLICATION

This application is related to and hereby claims the priority benefit of U.S. Provisional Patent Application No. 60/743,506 filed Mar. 16, 2006, incorporated herein by reference in its entirety.

BACKGROUND

A user seeking to use a service provided by an application connects over networks to access the application. Ordinarily, the user connects directly over the network to an application server running the application, regardless of a geographic location of the application server. After authorization, the user may then send a request including data associated with the context of the request to the application server, and in response, receive data from the application server.

FIELD

This application relates to a method and system for optimizing network traffic to a plurality of servers by, according to one embodiment, pre-processing URLs (uniform resource locators).

BRIEF DESCRIPTION OF THE DRAWINGS

Some embodiments are illustrated by way of example and not limitation in the figures of the accompanying drawings in which:

FIG. 11-21 illustrate an example embodiment of user interfaces associated with the web gateway configuration management console.

DETAILED DESCRIPTION

In the following description, for purposes of explanation, numerous specific details are set forth in order to provide a thorough understanding of one or more embodiments of the present invention. It will be evident, however, to one skilled in the art that the present invention may be practiced without these specific details.

In various embodiments, a context routing system may allow a data retrieval system to locate the best server(s) to facilitate a data request. For example, it may be used based on the context of a search request to locate an application server having the best geographic proximity to the most relevant database. As a result, this may minimize the latency of the communication between the application server and the database. In another embodiment, the geographic location of the data request origin (e.g., location of user/client machine) may also be factored into which application server to route the data request.

In one embodiment, a context routing system analyzes network traffic composed of one or more URLs to determine within a selected URL (e.g., via parsing the characters within the URL), what is meaningful with respect to routing the network traffic. The (meaningful) context obtained from the URL may be greater than that derived from a single extracted element/criteria (e.g., single token). In other words, multiple criteria are examined from the URL and are used in vectoring the network traffic (e.g., a search request/data request). This example of determining a context sensitive application route may allow the context routing system to vector the network traffic to an optimized route based on the URL context.

In one embodiment, a gateway within the context routing system may be configured as a proxy server, which will proxy each request for data (e.g., a search request) from a network device (e.g., a personal computer attached to a network) in order to determine an optimal destination (e.g., most applicable application server) and route to service the request. As a proxy, the gateway will have an opportunity to inspect the requests, and more specifically analyze the contents of the request to determine the optimal route and destination. In one embodiment, prior to forwarding the request to the selected application server, the gateway may even rewrite the request according to an optimization algorithm to create an optimized search pattern based on the contents of the request. In one embodiment, the gateway may handle at least two times the throughput of the application servers. For example, to maintain a 4:1 ratio, the gateway would handle eight times the throughput of a single application server.

Figure 1:
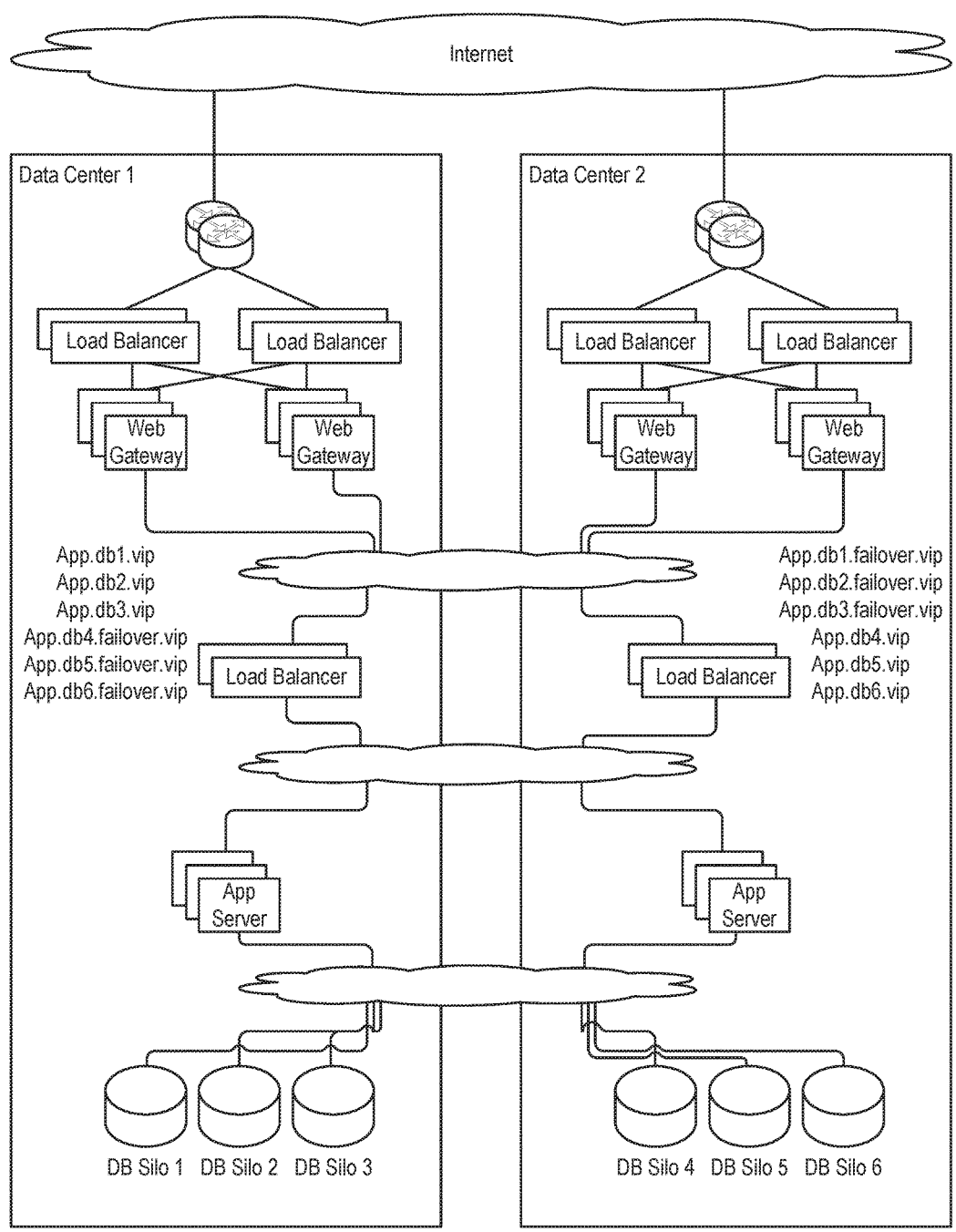
FIG. 1 is a diagram illustrating an example embodiment of a data retrieval system according to an example embodiment.

FIG. 1 is a diagram illustrating an example embodiment of a data retrieval system according to an example embodiment. The data retrieval system includes, according to one embodiment, a first data center and a second data center. In one embodiment, the first data center and the second data center may be geographically remote from one another. In one embodiment, the first data center and the second data center may be communicatively coupled to each other via an internal network structure. For example, each data center may be communicatively coupled between various points in a data path between various components of each data center. This relationship in this example is illustrated by the illustrated network clouds between each data center.

In one embodiment, the first data center and the second data center are in communication with a central network (e.g., the Internet). In one embodiment, a user (not shown) may submit a data query through the central network to at least one of the first data center and the second data center. For example, the data query may be received at the first data center at node and then communicated to one or more load balancers. The load balancers may determine which of the gateways may most efficiently handle the data query based on such factors as current load, projected load, etc.

In one embodiment, as discussed above, the gateways may be configured as a context routing system which may proxy each data request to determine an optimal route and destination for servicing the data request. Additionally, a gateway management system may be used to monitor each gateway and distribute configuration information (e.g., configuration files) to each gateway, including configuration information pertaining to determining an optimal route and destination for servicing one or more data requests.

Once the gateways determine the optimal path for the data request, the data request is communicated through the network to one or more load balancers. The load balancers determine, in the case of multiple eligible application servers, which one of those application servers is best able to handle or most efficiently able to handle the data request. Once that determination is made, the load balancers communicate the data request via the network to at least one application server, wherein one of the application servers is an optimal application server as determined by a gateway. The application server may then determine which of the databases is appropriate for the data request.

According to one embodiment, a gateway may append to the search request, and specifically, to the search string based on the formulated context of the search string as determined by the gateways.

Figure 2:
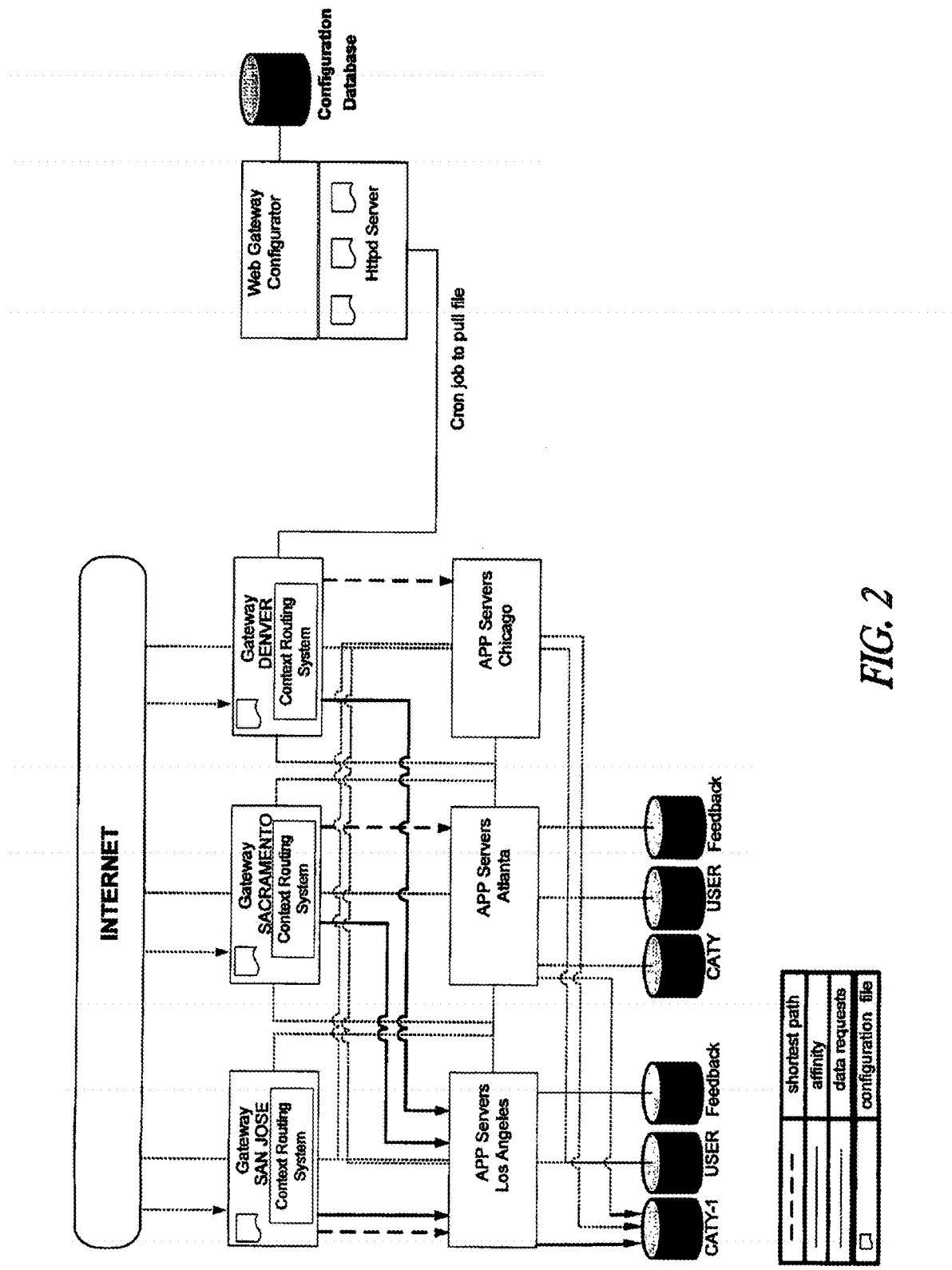
FIG. 2 illustrates an example embodiment of a data retrieval system including multiple web gateways including context routing systems.

FIG. 2 illustrates an example embodiment of a data retrieval system including multiple web gateways including context routing systems. The central network, in this embodiment, may be communicatively coupled to one or more gateways, which each may include a context routing system. As illustrated, the gateways are geographically remote from one another. For example, a first gateway is in San Jose, a second gateway is in Sacramento, and a third gateway is in Denver. In one embodiment, the gateways are correspondingly in communication with application servers in different geographical location. For example, an application server is located in Chicago, another application server is located in Atlanta, and yet another application server is located in Los Angeles. The application servers of the context routing system are communicatively coupled to a first database set and a second database set. The first database set and the second database set, according to one embodiment, may include a general database, a user database, and a feedback database. Returning to the gateways, each gateway may include a configuration file to determine how a gateway responds to a data request, and specifically according to one embodiment, how the gateway passes a data request to determine a context for routing the data request to the most appropriate application server.

In one embodiment, a gateway may periodically check for a new configuration file by polling a (web gateway) configurator, which includes a HTTPd server. The configurator is communicatively coupled to a configuration database, which stores one or more configuration files that may be distributed to the gateways. In one embodiment, the configurator may push the configuration files to each gateway at automatic intervals (e.g., upon release of a new configuration file) or by an administrative action. In one embodiment, the configurator may generate and push a custom configuration file to the gateway. The configuration may be based on receiving gateway configuration data from the gateway. The gateway alone or in conjunction with the configurator may then validate the new configuration data and upon successful validation load and use the new configuration file without disrupting the gateway's current work load (e.g., network traffic). In one embodiment, the gateway includes a third party application to manage network traffic routing, such as NetScaler®. The third party application may be configured to provide configuration information to the configurator, receive a new configuration file, validate the file, and seamlessly switch to the new routing configuration based on the new configuration file.

In one embodiment, one or more application servers of the context routing system may serve as a proxy and inspect each data request and route the request based on the request contents. In another embodiment, the context routing system may rewrite the request before being communicated to the (optimal) application server, if needed.

In various embodiments, the gateway may be implemented using one or more of a multitude of programmatic languages. For example, it may be implemented as a custom module developed in C or PERL, a Java application using a kernel, such as a V application kernel, or other customizable language, such as XML, etc.

Figure 3A:
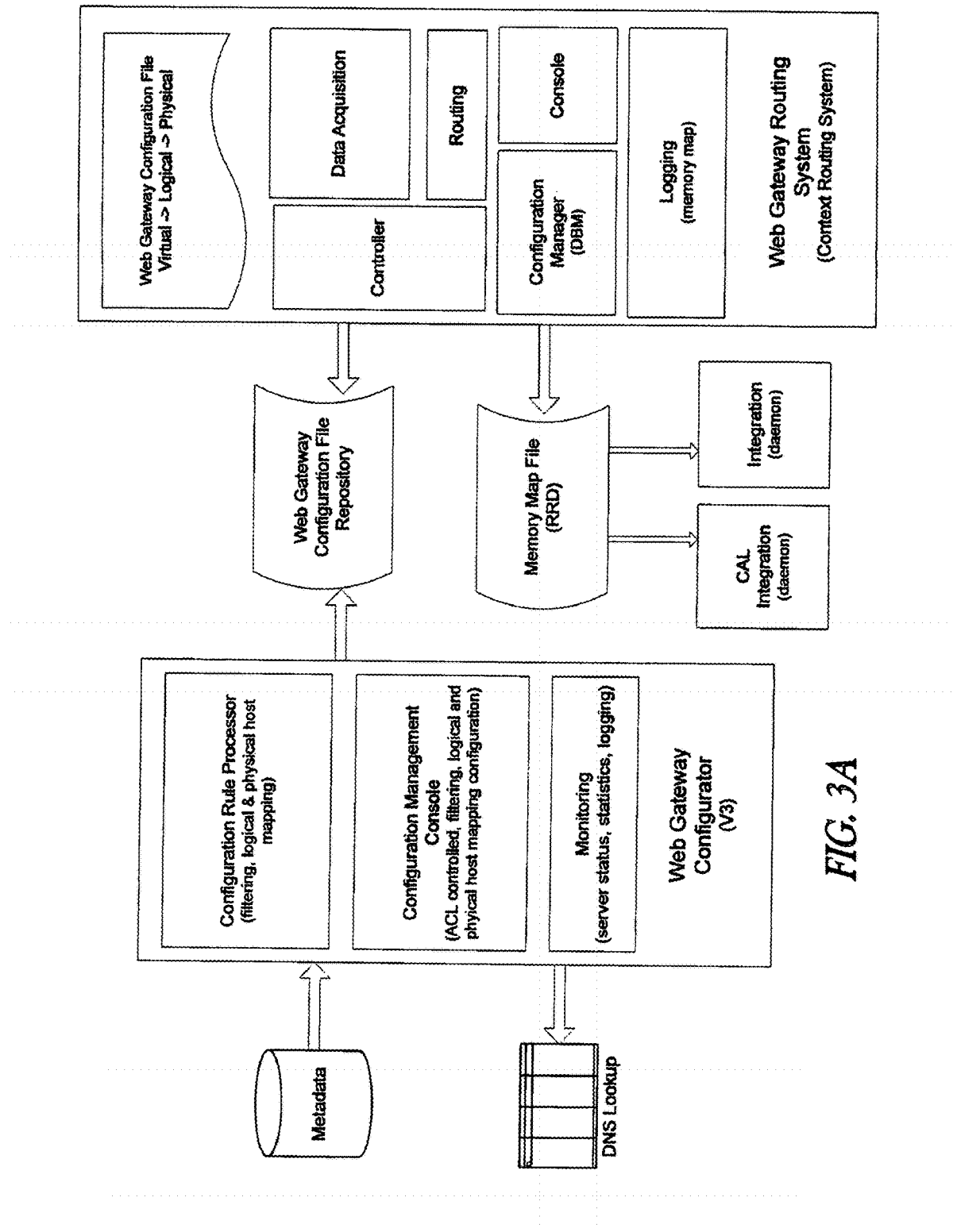
FIG. 3A illustrates an example embodiment of a data retrieval system including a web gateway routing system (e.g., a context routing system)

FIG. 3A illustrates an example embodiment of a data retrieval system including a web gateway routing system (e.g., a context routing system). In one embodiment, the web gateway consists of two major systems: a web gateway configurator and a web gateway routing system. These systems may be designed to exist as two separate web pools running on two different platforms (e.g., V3 and Apache Modules). These systems may be connected through a set of configuration files that are accessible on an external file repository, with the configurator being the producer and the routing system being the consumer of these files.

The configurator may consist of a rule processor, a management console and a monitoring unit. Given a set of metadata in the database, the rule processor may be responsible for transforming the metadata into a set of logical and physical routing rules and exporting them as XML files for the routing system's consumption. The configuration management console may also provide a set of configuration tools for operations and product development to setup/prepopulate a set of metadata and to configure these routing rules on demand. Lastly, the logging may be available for monitoring purposes.

In one embodiment, the routing system may consist of a routing component, a management console, a configuration manager and a logging unit. The routing component may parse the incoming requests and determine where to route the requests to, based on a set of routing rules as discussed herein with respect to contexts of data requests. These rules may be derived from the XML file generated by the configurator. Periodically, the configuration manager, which acts as a daemon process, may poll the repository to see if there's a new version of the XML that it needs to pick up. Detailed logging may happen throughout the system to provide adequate data for monitoring and alerting purposes.

Figure 3B:
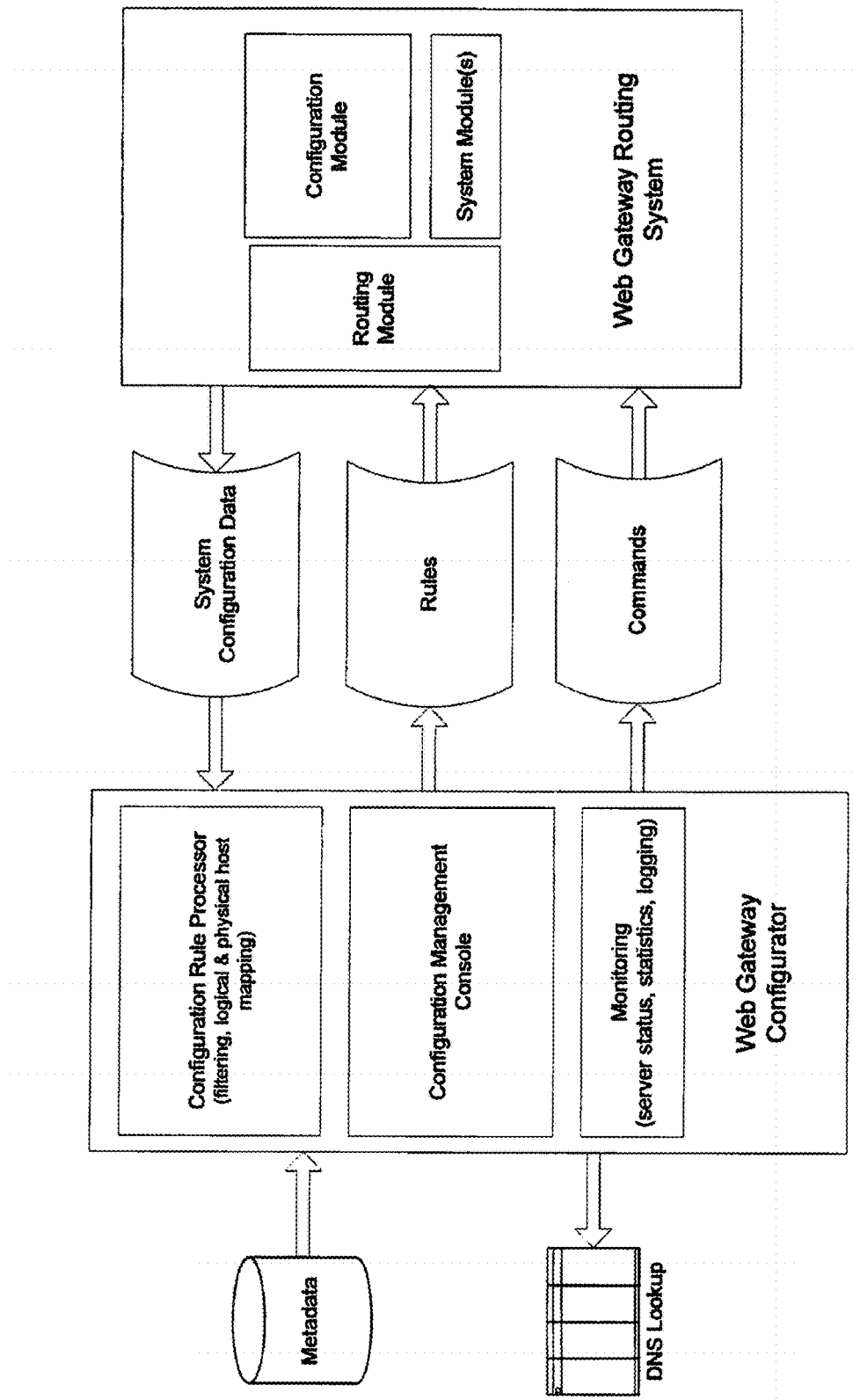
FIG. 3B illustrates another embodiment of a data retrieval system including a web gateway system and a web gateway configurator system.

FIG. 3B illustrates another embodiment of a data retrieval system including a web gateway system (e.g., a context routing system) and a web gateway configurator system. These systems may be designed to exist as two separate web pools running on two different platforms (e.g., V3, Apache, Netscaler, etc.). In one embodiment, the web gateway configurator gathers information from a particular web gateway system to determine its configuration and configuration parameters. For example, the information may include physical configuration, database connections, connected database types and parameters, traffic statistics, etc. Once the information has been gathered, the web gateway configurator may accordingly generate and push a configuration file tailored to the web gateway system. After receiving the configuration file, the web gateway system in conjunction with the web gateway configurator may validate the configuration to ensure system integrity will be maintained upon switch to the new rules and policies of the configuration file. Once validation is successfully completed the web gateway system may automatically or by command from the web gateway configurator seamlessly switch to the new configuration without interruption to current network traffic (e.g., a data request). In one embodiment, the configurator may consist of a routing module, a configuration module, and one or more system modules to implement at least the operations discussed above.

Figure 3C:
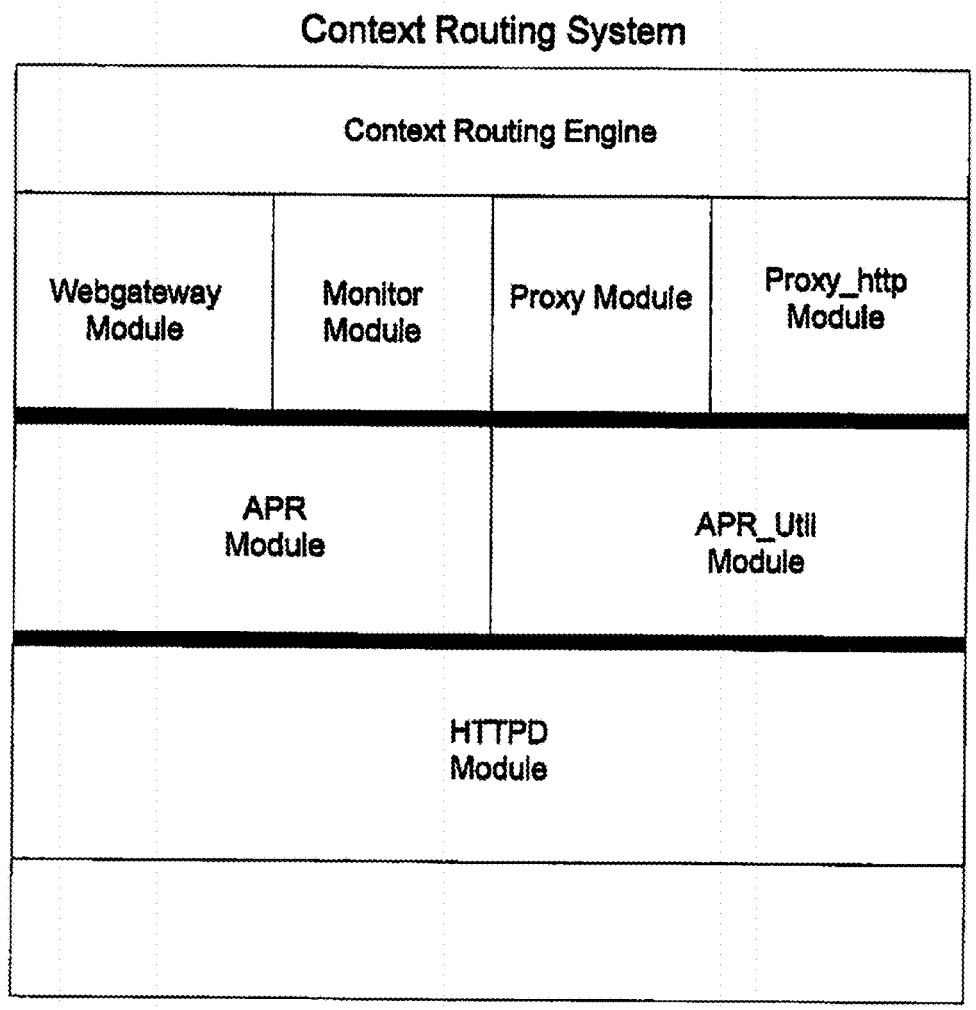
FIG. 3C is an example embodiment of a context routing engine.

FIG. 3C is an example embodiment of a context routing engine. The context routing engine includes a web gateway module, a monitor module, a proxy module, proxy_http module, an APR module, an APR_util module, and a HTTPD module. In one embodiment, the web gateway module may filter the inbound data request and determine if the data request may need to be proxied. If so, where should the data request be vectored.

In one embodiment, the web gateway module examines each inbound data request, determines where it needs to be routed via the methods described herein for determining an optimal route, and sets the appropriate fields in the request to invoke reverse proxy behavior in the proxy module. In one embodiment the monitor module may implement a custom logger, which may track performance metrics for the server to support monitoring and alerting.

In one embodiment, the web gateway module and the monitor module may be written in C, against an interface, such as an Apache® interface. In one embodiment, to support portability, the web gateway module and the monitor module may use Apache® APIs for memory management and interaction with the underlying data retrieval system. In various embodiments, the remaining modules are configured to facilitate the methods and systems described herein and in accordance with common methodologies known in the art.

Figure 4:
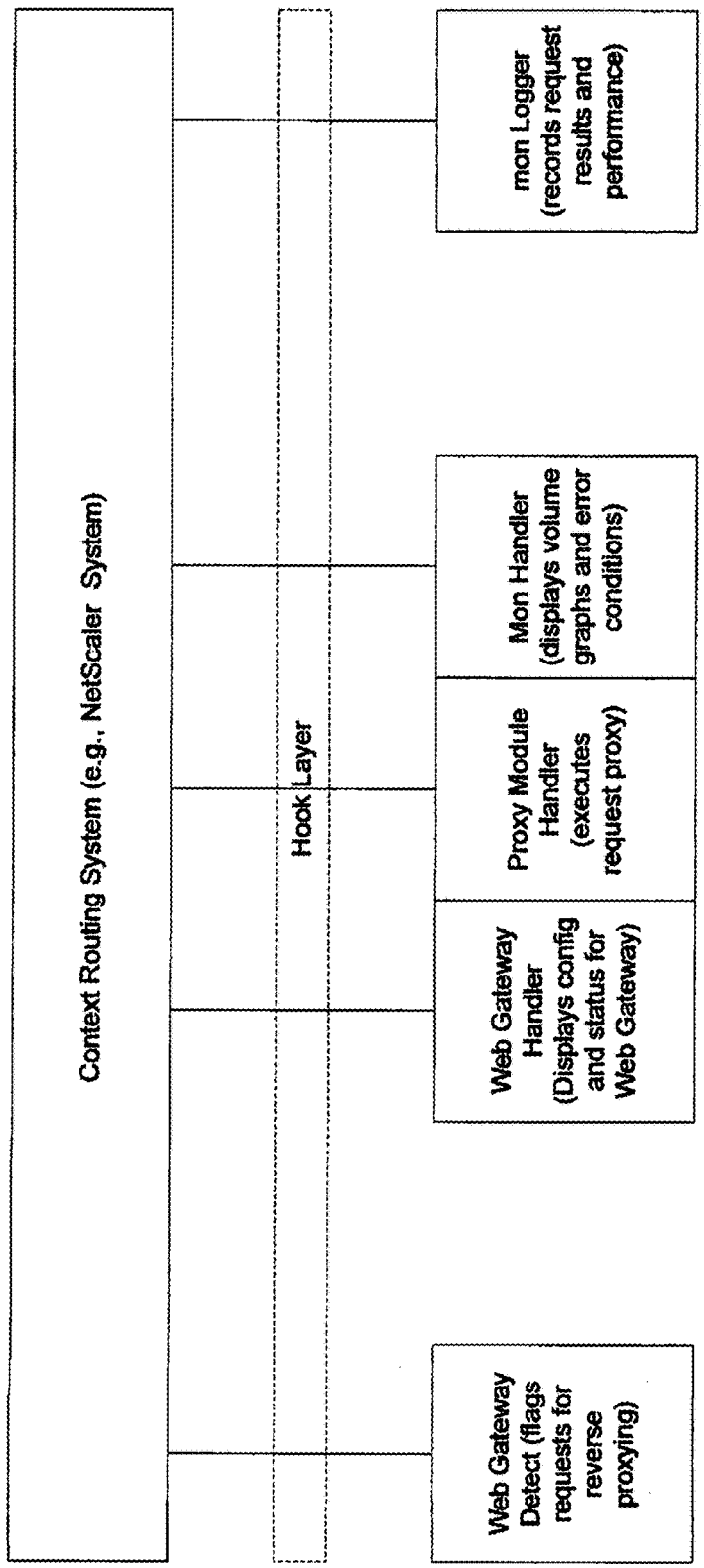
FIG. 4 illustrates, according to one embodiment, a web gateway request flow diagram associated with the operation of a context routing system including one or more web gateways.

FIG. 4 illustrates, according to one embodiment, a web gateway request flow diagram associated with the operation of a context routing system including one or more web gateways. In a first operation (Post Read Request), a web gateway (e.g., gateway(s), gateway) of a context routing system may examine a data request, and determine whether it needs to be proxied and where it should be vectored by inspecting the request and determining a context of the data request (e.g., based on URL text). In a second operation (web gateway handler), the web gateway may determine whether an admin page is being requested. If so, then it paints that page and returns. In a third operation (proxy module handler), a proxy module may determine whether a proxy has been requested. If so, the proxy module executes the proxy. In a fourth operation (Estore_mon Handler), a monitor module determines whether a monitoring page has been requested. If so, the monitor module paints the requested page. In a fifth operation (monitor logger), a monitor module stores appropriate metrics for the current request.

Figure 5:
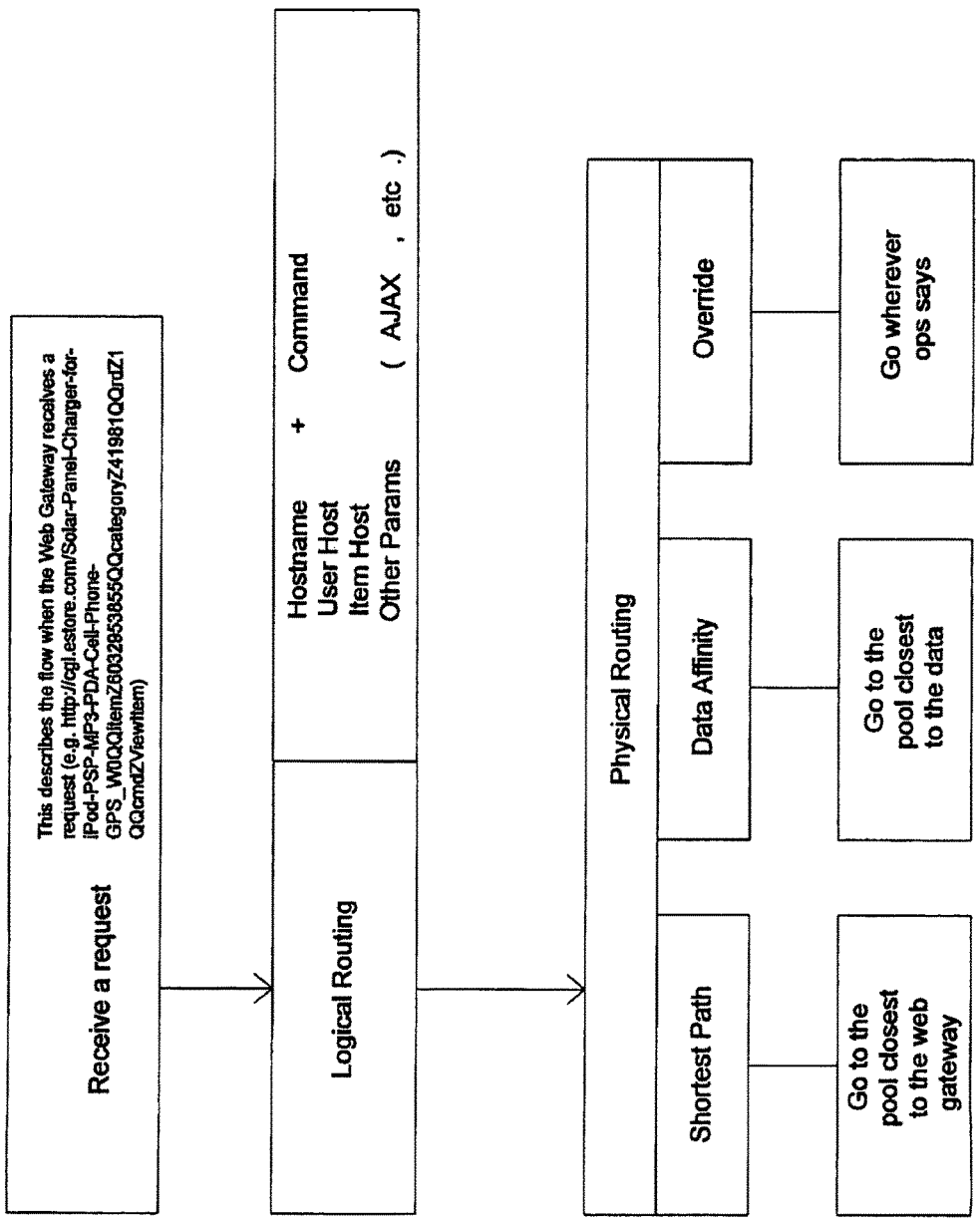
FIG. 5 is a diagram, according to an example embodiment, of a data request including example logical routing and physical routing options.

FIG. 5 is a diagram, according to an example embodiment, of a data request including example logical routing and physical routing options. In one embodiment, the routing engine, including the context routing engine, consists of three major components: a front controller, a data acquisition and routing (see FIG. 3B). The front controller may use the data acquisition to parse the required information and may perform the necessary look up in routing data structures.

The logical routing may include at least one of a host name and command, a user host, an item host, and other parameters. The logical routing configuration may consist of a set of virtual mappings based on a set of pertinent parameters, such as command, item identification (id), and cookie information, from the request. Each virtual or logical rule may be decorated with one or more parameters, which may be associated with one or more values. These values may be evaluated with a logical OR operation. Depending on the parameter, each of these virtual mappings may then be resolved into either yet another virtual or a logical routing rule. The derived logical rule may then align with the request's primary data resource location.

In one embodiment, the physical routing algorithm may include logic that determines the data request be routed according to the shortest path between the application server closest to the gateway, according to data affinity, or routed based on an administrative override. Data affinity, according to one embodiment, may be determined by a context routing system as described herein. A configuration at this level may require intimate knowledge of the physical locations of the application pools and the data hosts that these pools need.

In one embodiment, item affinity routing may be used to efficiently route a request (e.g., a "ViewItem" request) to an application server in a data center where the item host resides (containing the item). In one example embodiment, the URL needs to have the item host id and a logical configuration may contain the mapping for each item host. A gateway may then route the request(s) to a "ViewItem" application server in an appropriate data center using the item host id.

In another embodiment, user affinity routing may be used to efficiently route a request (e.g., a "MyEstore" request) to an application server in a data center where a user host resides (containing the user). In one embodiment, a user host id may be set as cookie during a sign-in process and a logical configuration may contain a mapping for each user host. A gateway may then be able to route the request(s) to a "MyEstore" application server in an appropriate data center using the user host id.

In an example embodiment of an administrative override, an administrator (user) may have the ability to dismiss any optimization that was done at the logical layer and to route the data request to a specific data center based on a conscious decision. Additionally, the administrator may further fine-tune the traffic distribution across the data centers with a percentage ratio in an override situation. For example, the administrator may choose to direct 70% of a first type of traffic (data requests) to Atlanta, while the remaining 30% goes to Los Angeles.

In one embodiment, a special type of logical routing configuration is a filter. While the logical routing rule allows only one parameter, a filter may have one or more parameters and the evaluation may be performed with a logical AND operation. Additionally, each filter may be associated with a well-known action, which either terminates the request or sends it to a physical VIP.

In one embodiment, filters may provide a simple mechanism for the system's operators (e.g., administrator) to quickly react to emergency situations, in which a specific portion of site traffic may need to be blocked immediately or diverted to a specific location. Therefore, filters may take precedence over the logical to physical mapping in the routing process, if they exist.

In an example embodiment illustrating routing by data affinity, the iterative steps that a context routing engine may take to route a "ViewItem" request to one or more application server pools in Chicago may look like the following:
WebGatewayRootPool::
  cgi.estore.com→Routing→V3Cgi0Core::ViewItem (virtual)
  V3Cgi0Core::ViewItem→Routing→V3 Cgi0Core::ViewItem::caty5 (logical)
  V3Cgi0Core::ViewItem::caty5→Routing→cgi.sjc.vip.estore.com (physical)

In an example embodiment illustrating a shortest path approach, context routing engine may take iterative steps to route a "MyEstoreForGuests" request, which has no data affinity, to application pools situated in Atlanta because the web gateway that handles the request is located in Atlanta. For example, the iterative steps for this request may look as follows:
WebGatewayRootPool::
  my.estore.de→Routing→V3MyestoreIntl::MyEstoreForGuests (logical)
  V3MyestoreIntl::MyEstoreForGuests→Routing→my.smf.vip.estore.com (physical)

Figure 6:
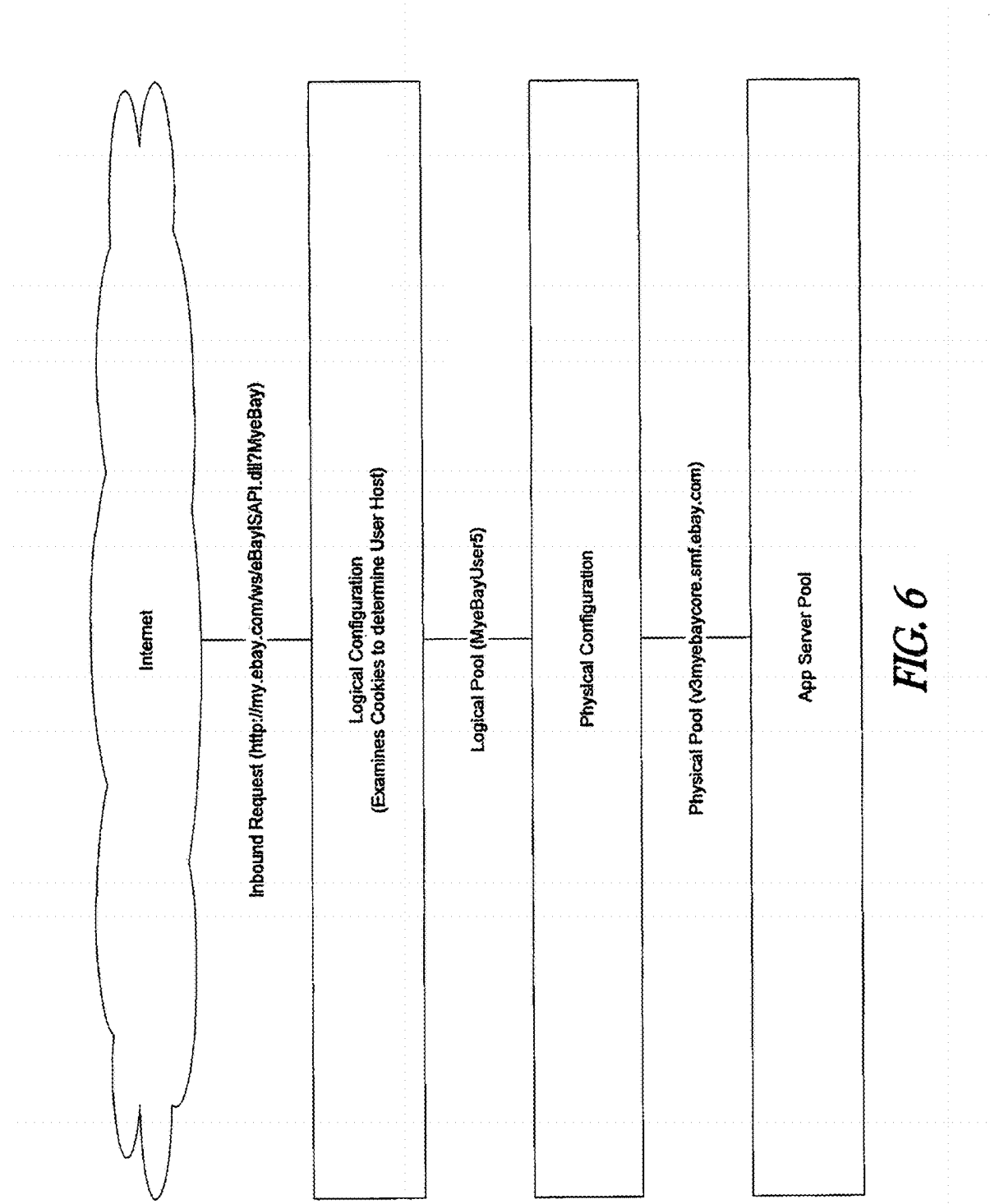
FIG. 6 illustrates a context routing system configuration of a web gateway, according to one embodiment.

FIG. 6 illustrates a context routing system configuration of a web gateway, according to one embodiment. The configuration of the web gateway may consist of two layers. The first layer of configuration (the logical layer) may be a mapping from request qualities, such as command, item ID, or user host ID, to a virtual entity called a logical pool. Logical pools may be aligned with their primary resource dependencies (e.g., userhost, catyhost, etc.) The second layer (the physical layer) may map from these logical pools to physical pools. This layer may enable logical pools to be mapped to actual VIPs in the data center. This may be done inside the web gateway.

Figure 7:
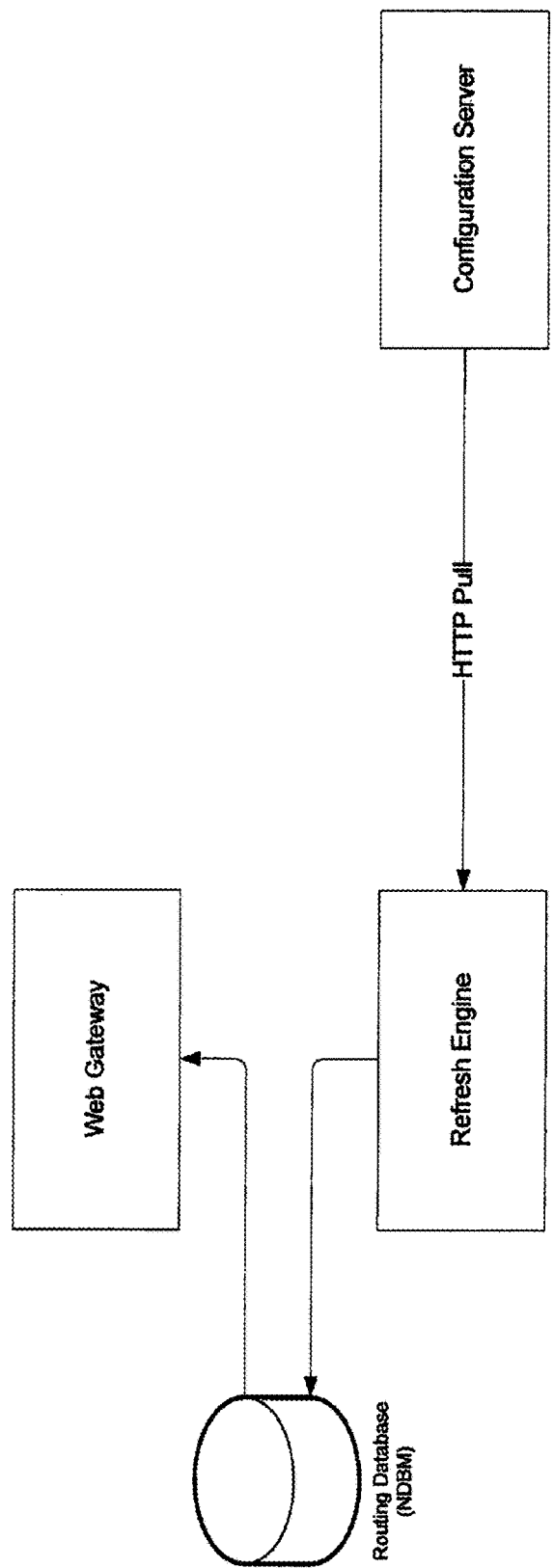
FIG. 7 illustrates an example embodiment of a web gateway in a context routing system configured to support rapid failover of functionality from one data center to another.

FIG. 7 illustrates an example embodiment of a web gateway in a context routing system configured to support rapid failover of functionality from one data center to another. In one embodiment, the routing data must propagate quickly and reliably to all web gateways and any web gateways that are not running at the time that routing data is updated must replace stale routing data prior to routing traffic.

In one embodiment, routing data is stored in a local DBM-type database (e.g., a NDBM). A daemon on the web gateway host may periodically smay for newer versions of the DBM database on a set of distribution hosts, and when one is found, they may download, verify the new database, and replace the existing one. The web gateway may detect the fact that the database has been updated, and connect to a new database. In one embodiment, the web gateway may connect to the configuration database in place, rather than copying it to an internal cache.

In one example embodiment, the web gateway of a context routing system may track, at the web gateway level, at least the throughput, average response time, and success percentage of requests that it is routing. These metrics may then be presented in a form easily understandable to a user, such as a system administrator. In one embodiment, the metrics may be broken down according to pool and/or command. In another embodiment, the system may include the ability to alert locally—that is, to detect error conditions on each web gateway, where they could be propagated through standard alerting mechanisms known in the art.

Figure 8:
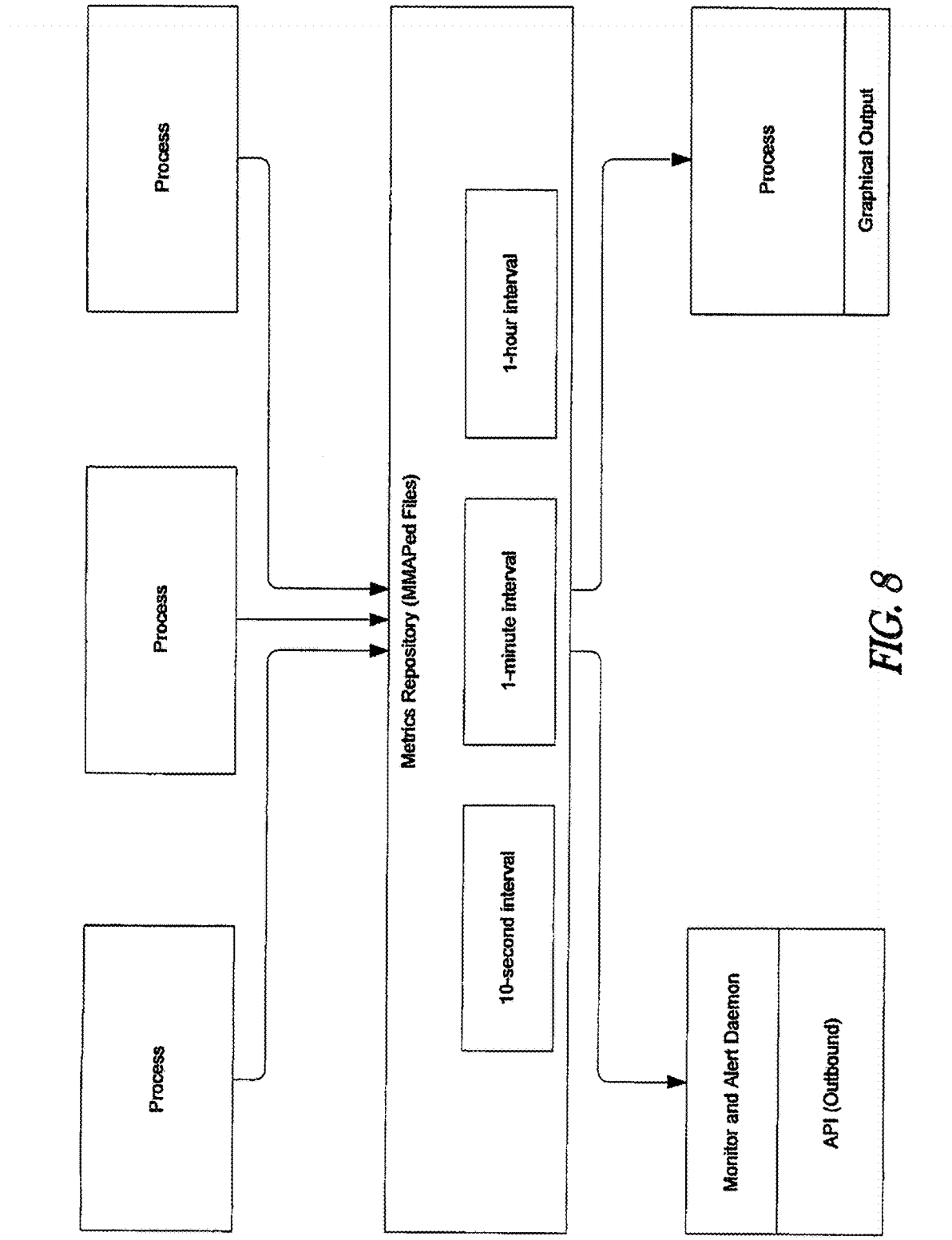
FIG. 8 illustrates a diagrammatic representation, according to one embodiment, of a local metrics database in a memory-mapped file.

FIG. 8 illustrates a diagrammatic representation, according to one embodiment, of a local metrics database in a memory-mapped file. This database may be implemented in a round-robin pattern, with an implicit limitation of the amount of history stored. In various embodiments, the metrics and parameters may include the following, metrics (per database): requests, total time, successes, and failures, etc.; datasets (per metric)—second intervals, —minute intervals, —hour intervals; measures (per metric) sum of values, and count of values; and sum of squares of values (for standard deviation). It should be noted this list is an example only and the actual metrics parameters may include less or more collected data points.

In one embodiment, a comprehensive data model may be designed to support the management of the filters, the logical-to-physical routing rules with complete auditing capability and versioning in selected key tables. Tables may be created to support the model and they may exist as an entity in the new logical data host.

In one embodiment, the configuration data may not be cached upon server start-up and every data access may cause a trip to the database. This may allow an instantaneous view to the latest or the latest of a specific version of the configuration data.

This example embodiment of a data model may also provide storage for generated XML files and the relevant phased deployment information pertaining to each web gateway. The XML files may be stored as blobs in a database. In one embodiment, these XML files may be cached for performance reasons.

In one embodiment, data versioning may exist at a rule level, and may be indented for an administrator to make configuration changes for one or more future features without impacting what is used in production. Each modification may be done in its own version and there may be no concurrent update to the same version.

In one embodiment, filters, logical and physical configurations may share the same version. Therefore, a new version means that a complete set of configuration from its processor may be duplicated for modification. A version may be opened for changes until it is marked completed or finalized.

In one embodiment, any changes to the configuration data may be validated before they are published to the repository. In various embodiments, validation may be done:
  independently at the impacted configuration tier(s), or
  collectively across the tiers In one embodiment, if there is a change to the logical configuration, an implicit validation of the logical configuration to ensure the referenced physical routing components exist in the physical configuration may be done prior to saving the changes to the database. In one embodiment, the physical components must be in place before any references are made to them from the logical tier. On the other hand, the relevant DNS lookup may be performed if new physical pool or data host are added.

Here is an example sequence of events when a feature requires new DNS and new routing rules:
    administrator adds the new DNS to the zone file
    administrator inserts a new physical pool (and resource if needed) at the Configuration Management Console
    administrator creates a new physical routing rule at the physical configure tier
    administrator creates a CR to add a new logical rule that references the new physical routing rule.

The web gateway configurator may leverage an authentication and authorization capability from one or many programmatic applications for access control, etc. (e.g., ASAC) to provide fine grain access to the web gateway configuration management console. The concept of role and other features may allow an administrator to create access groups with different access controls to the console. For example, a selected group of developers may have read-only access to the routing rules, while a selected few people may be granted with read, write and publish access.

Figure 9:
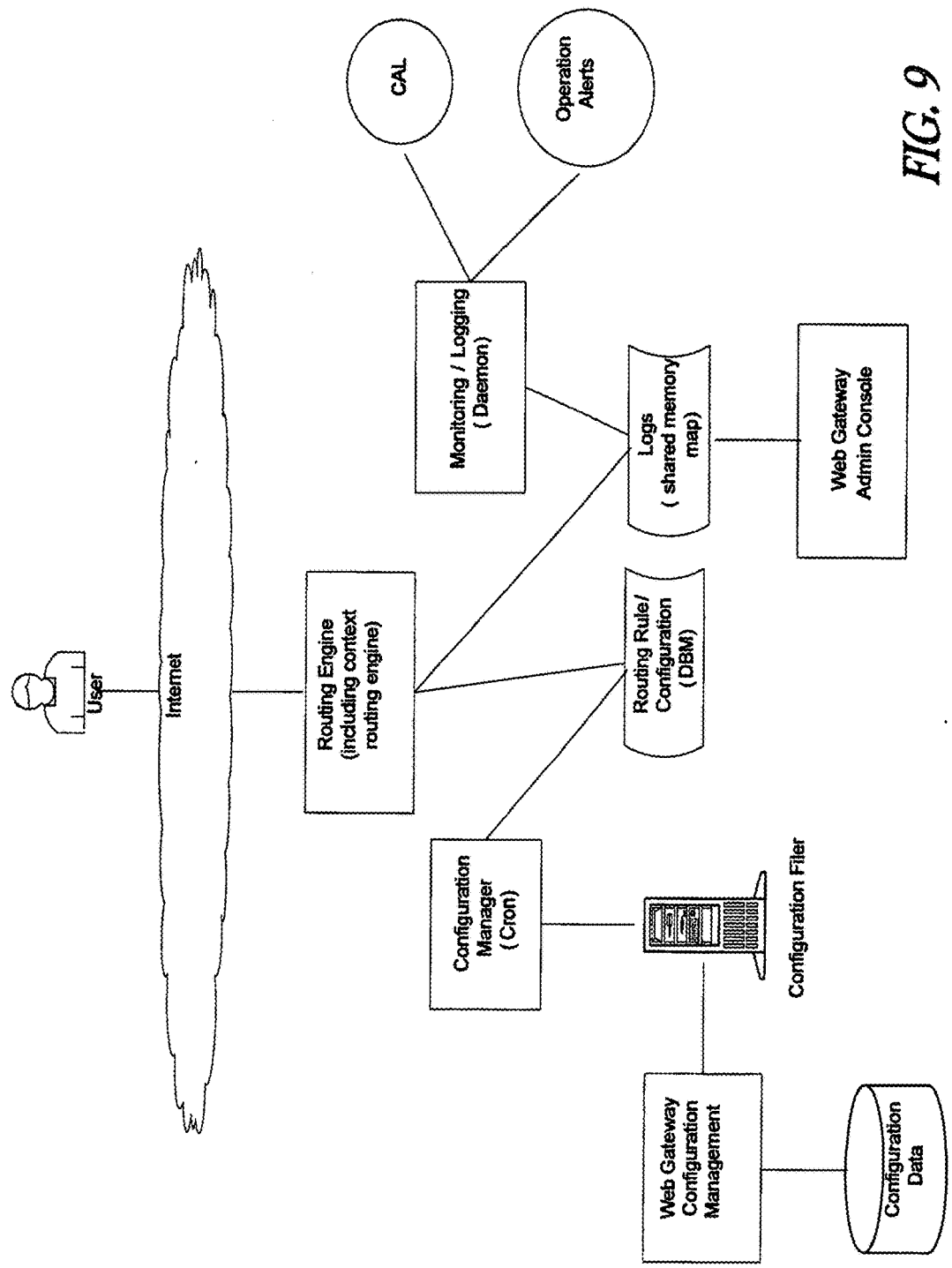
FIG. 9 illustrates, according to an example embodiment, web gateway configuration elements.

The web gateway configuration elements discussed above (e.g., the context routing engine, web gateway admin console, etc.) is illustrated in a diagram, according to one embodiment, in FIG. 9 (see also FIG. 2).

Figure 10:
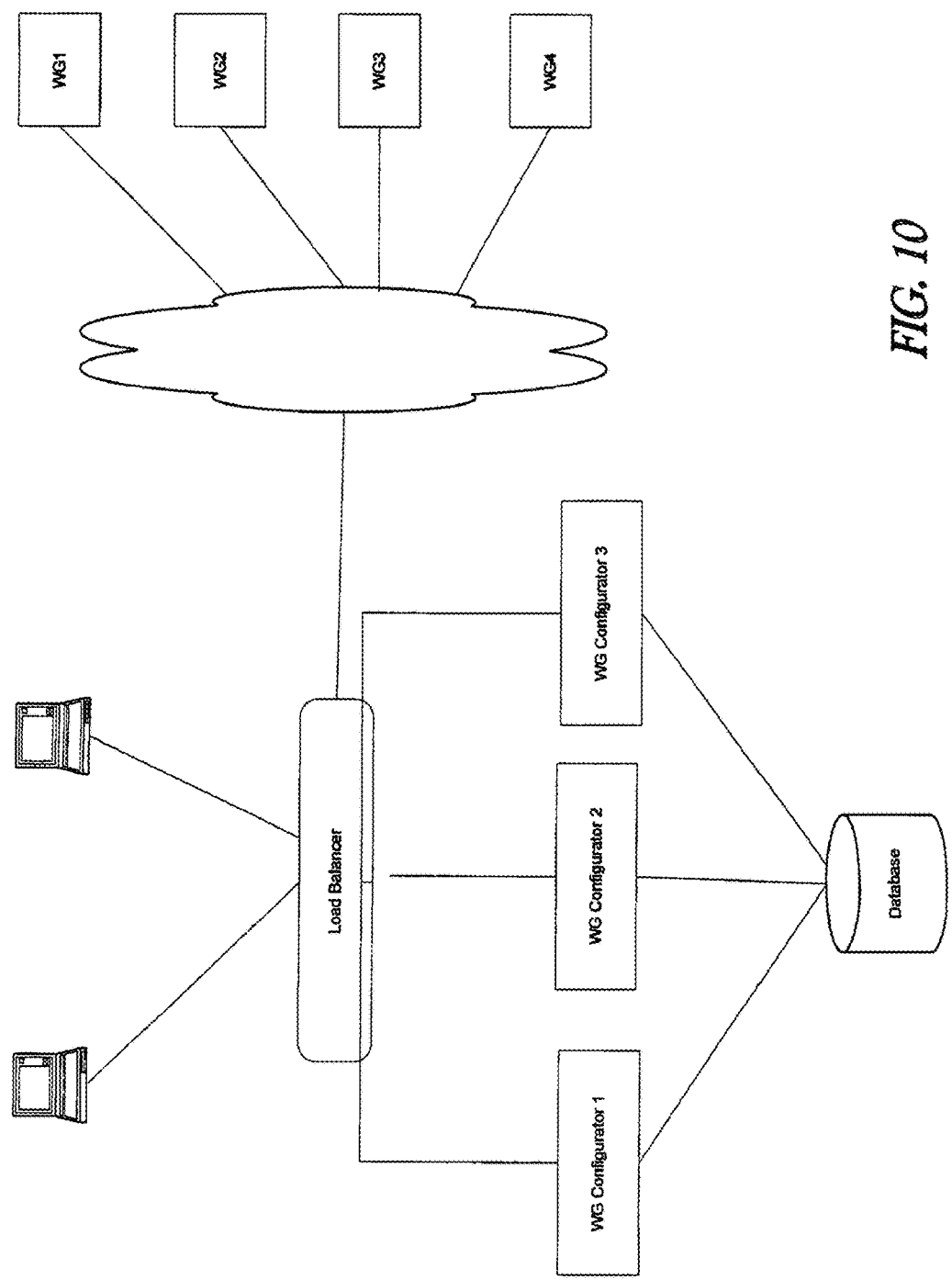
FIG. 10 illustrates an example embodiment of a configurator that provides a centralized mechanism for an administrator to distribute and to activate a specific versions of configurations.
Figure 11:
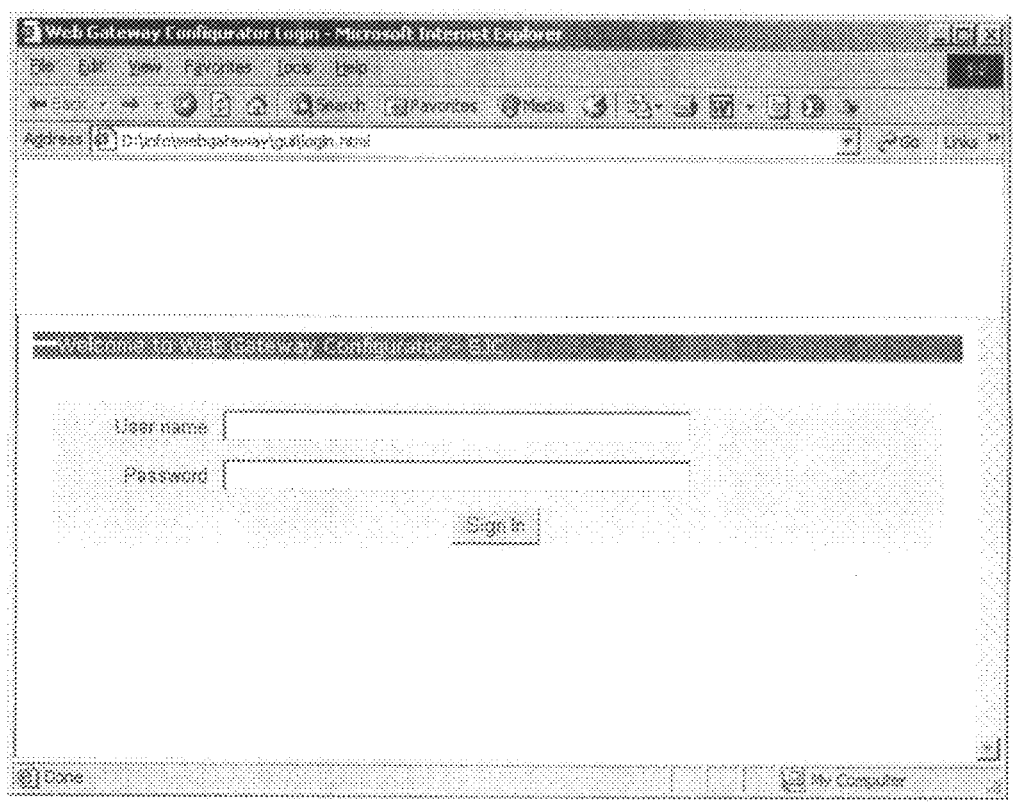
Figure 12:
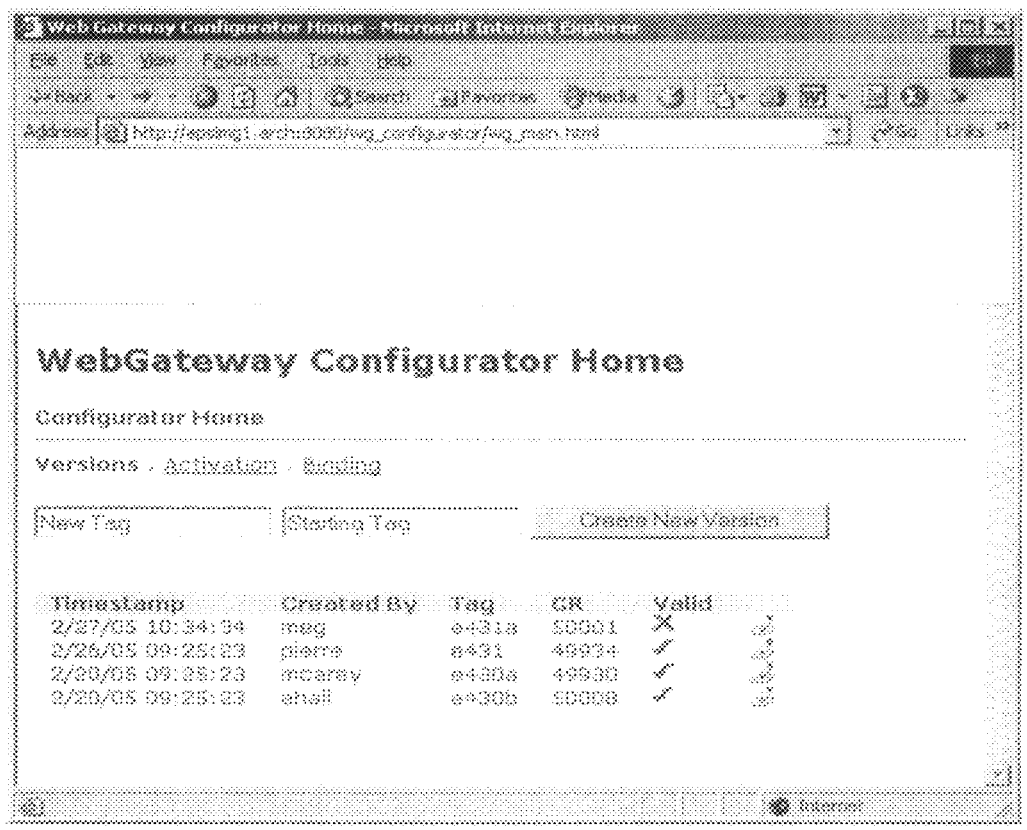
Figure 13:
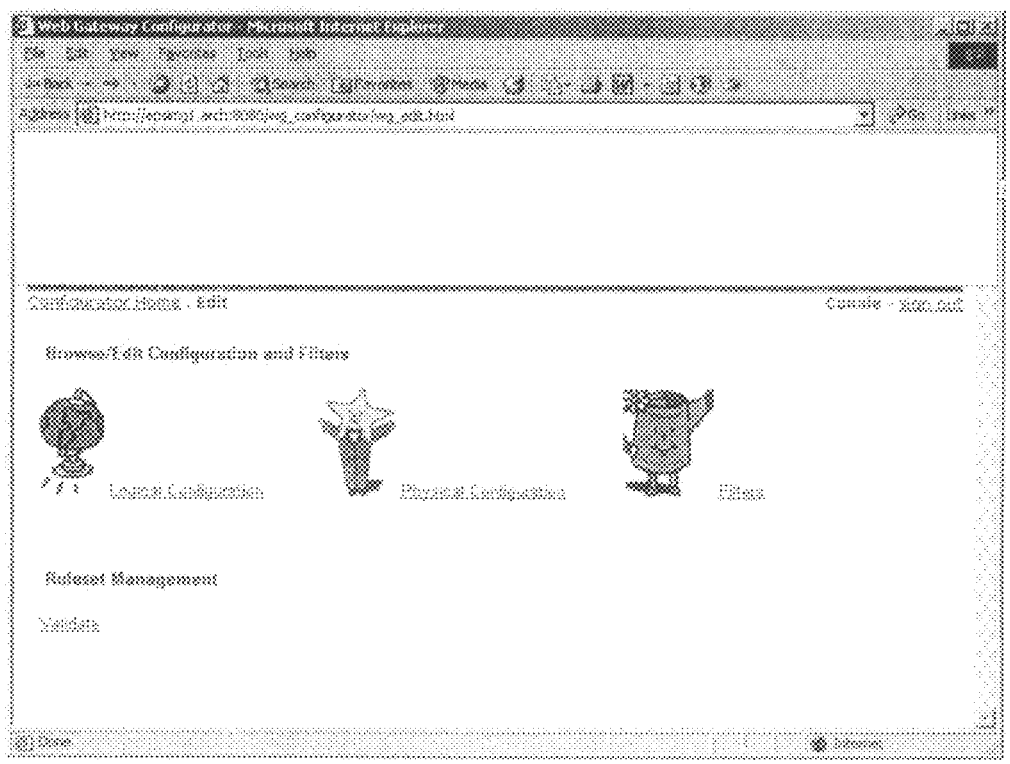
Figure 14:
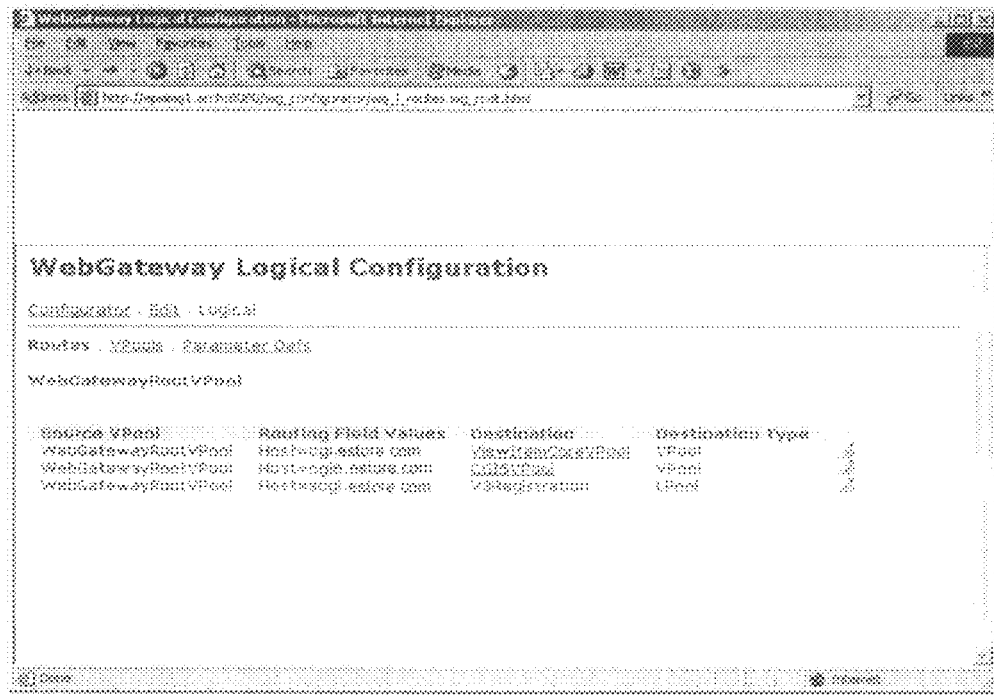
Figure 15:
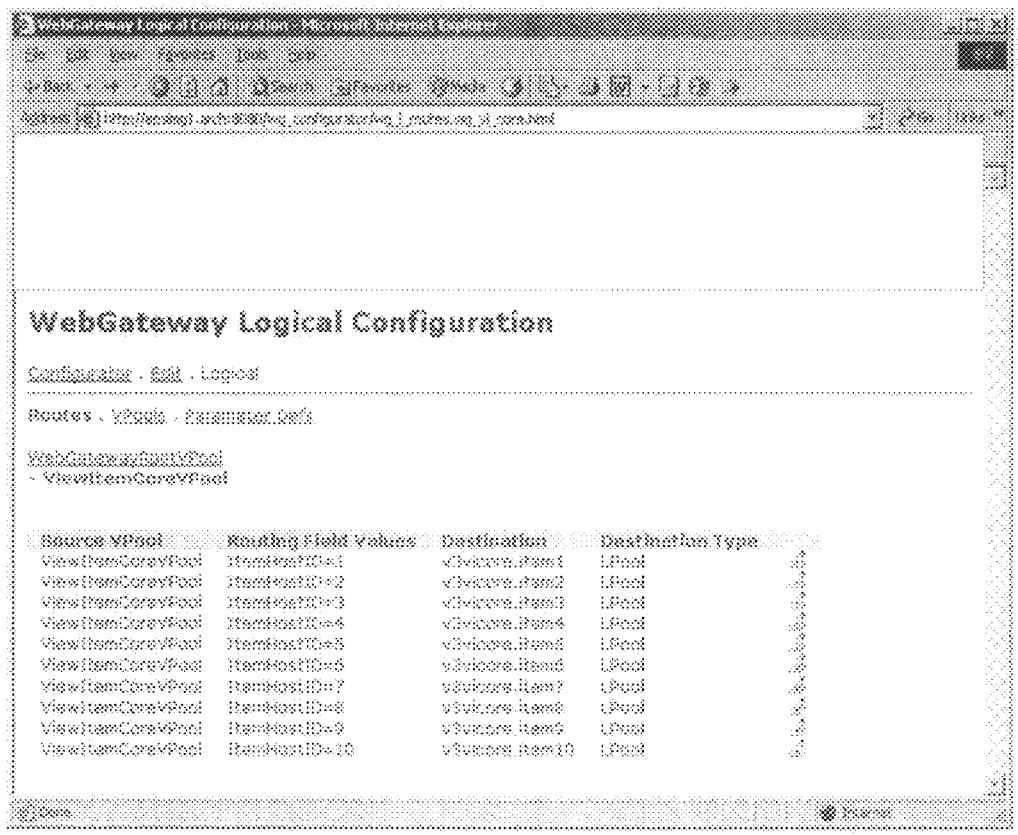
Figure 16:
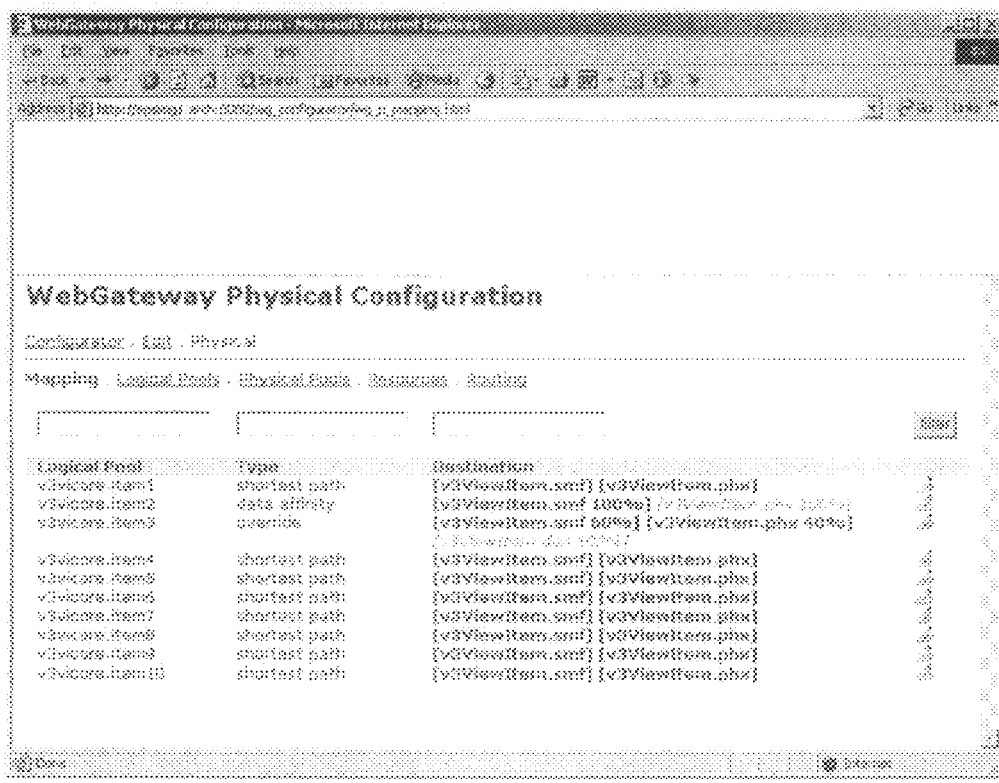
Figure 18:
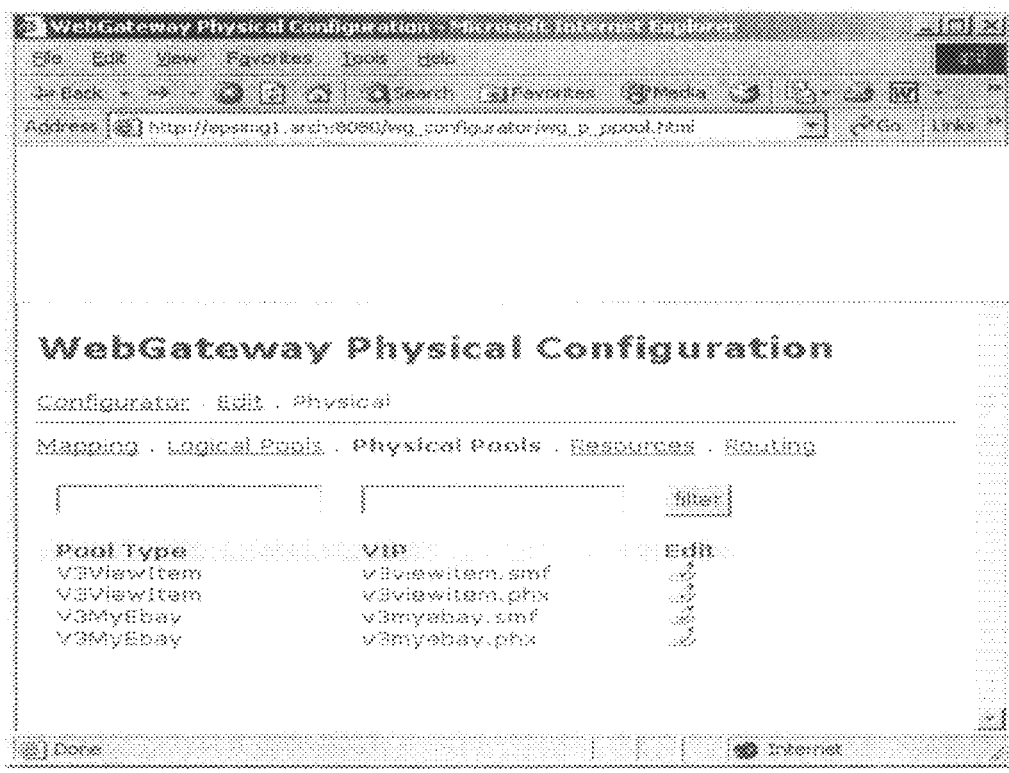
Figure 19:
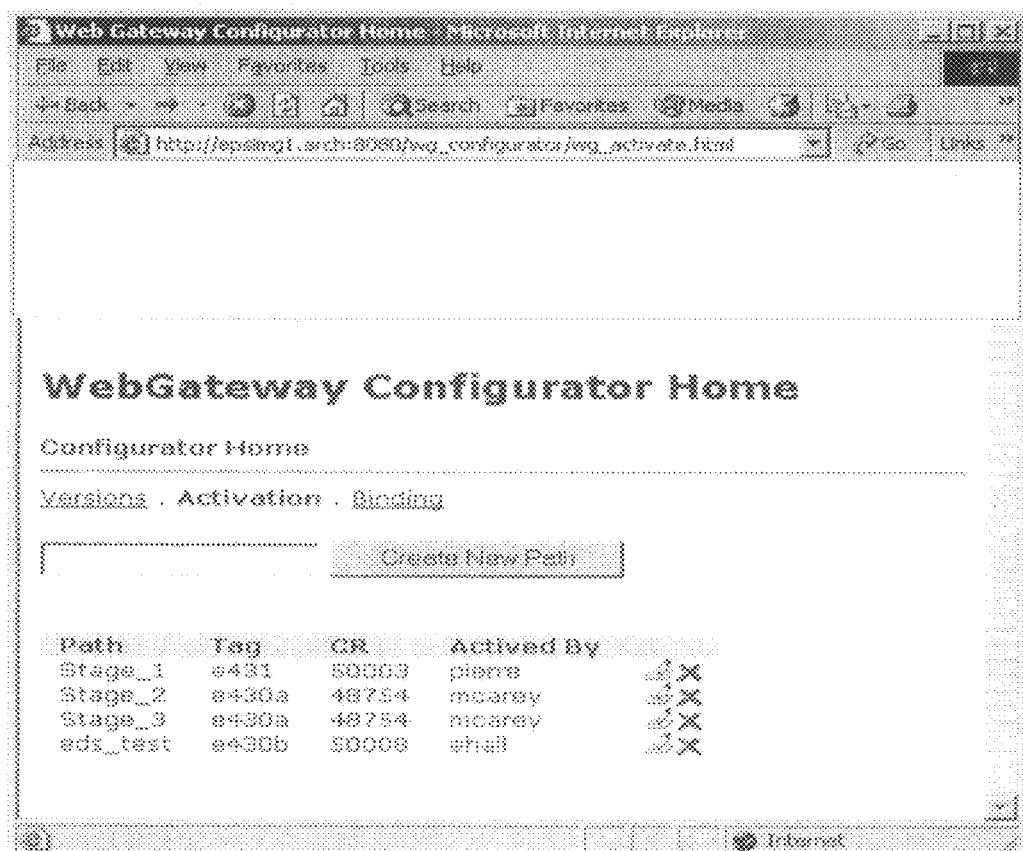
Figure 20:
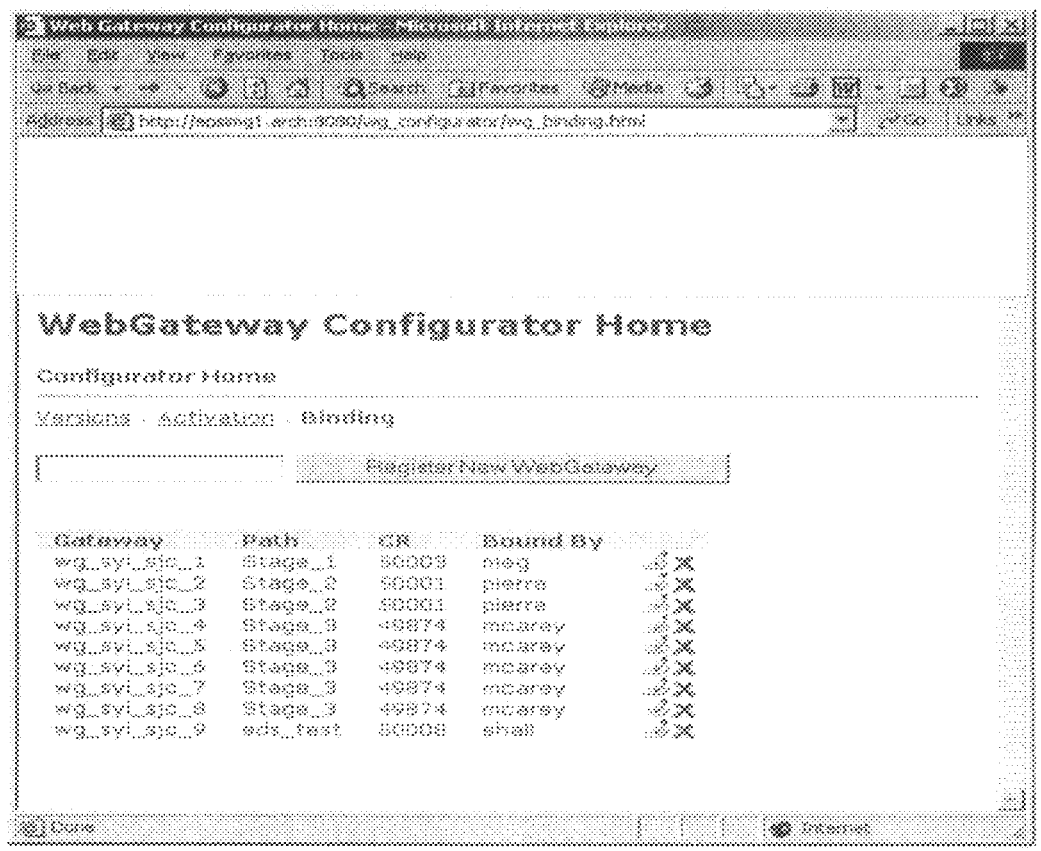
Figure 21:
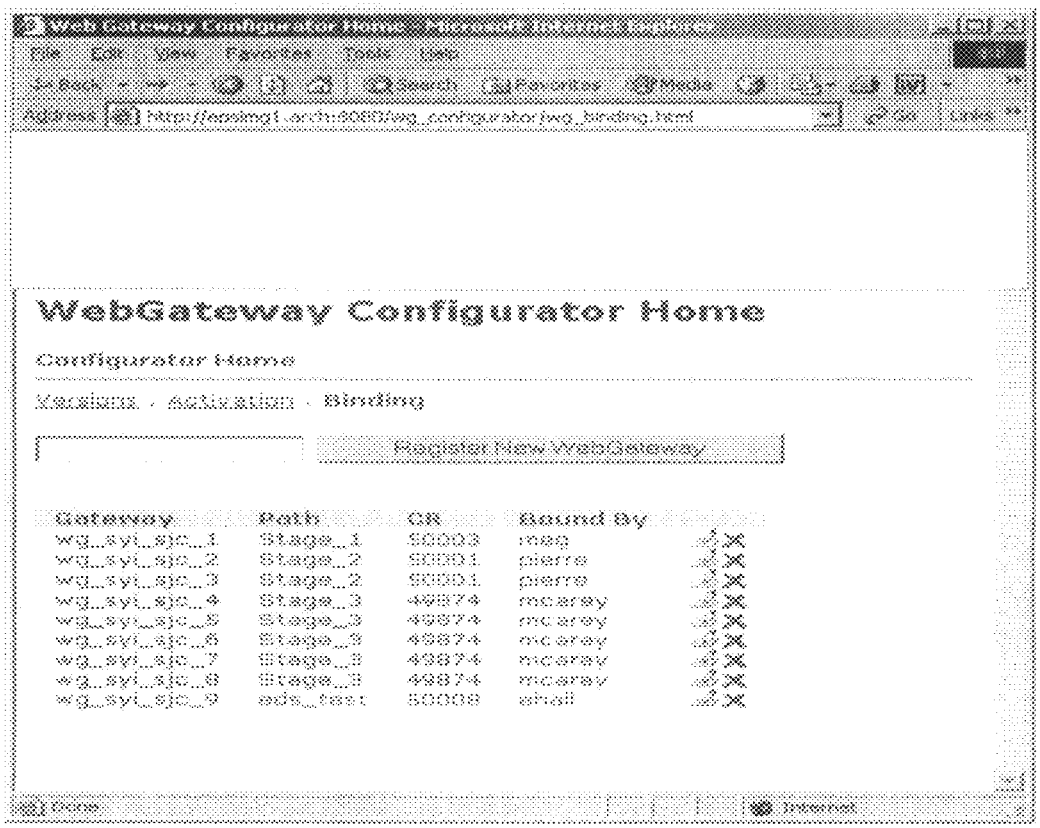

In one embodiment, as illustrated in an example embodiment in FIG. 10, a configurator (e.g., web gateway (WG) configurator 1) may provide a centralized mechanism for an administrator to distribute and to activate a specific version of the configurations as three different XML files to the repository, which may be the configurator, backed by the database. Via the console, the configurator may provide a unified view of all the registered web gateway machines and the version of the configuration XML file that each web gateway is using.

In one embodiment, when a set of configuration data is ready for web gateway consumption, an administrator may simply mark a designated version finalized and distribute it by writing one or more generated XML files as blobs to a database. Upon distributing the new version, the administrator may now select the deployment template for rolling out a new configuration. Analogous to a directory structure, the administrator may simply specify the location(s) where the new configuration is supposed to go to. These locations may be viewed as a way for the administrator to rollout new changes in phases. In one embodiment, the XML files may also be written to disk for viewing and other purposes.

In one embodiment, once a selected configuration version is activated, the administrator will need to bind or associate a web gateway to a location. By doing so, each web gateway may be able to pick up a new configuration at a next scheduled polling period. As part of this process, the new configuration XML files may also be cached in the memory for performance reasons.

In one embodiment, each configurator may be periodically scheduled to query for the latest configuration XML files from the database. Upon a successful binding, a configurator is refreshed with the latest set of XML files at the next scheduled data base access layer cache refresh period. To support the required phased deployment, the data base access layer cache must be big enough to support more than one set of these XML files at any given time. Depending on the binding strategy, the proper version of the XML files should be given to a web gateway.

The web gateway configuration management console (see FIG. 9) may provide a centralized location for viewing, managing, activating and binding the configuration data. According to various embodiments, FIGS. 11-21 illustrate an example embodiment of user interfaces associated with the web gateway configuration management console in a series of operations that an administrator (or other user) may perform in facilitating the configuration of one or more web gateways. As illustrated by these figures, these operations may include, login, select a version, edit, edit logical configuration, edit physical configuration, activate, bind, and binding.

In one embodiment, the web gateway configuration administrative console may also provide a web gateway specific configuration, such as maximum virtual pool loops. In one embodiment, the web gateway may include the following responsibilities:
    Configuration Manager: Read configuration XML files from "Configuration File Repository". It will periodically (for configurable period) poll the new configuration and update the configuration if it has newer timestamp since last update.
    Routing: Route a request to a physical host in appropriate data center using the directions in configuration.
    Monitoring and Alerting: Record statistics of the traffic per physical host in Round Robin Database (RRD). Integrate with CAL for logging and alerts regarding system's health.
    Administrative Console: Show the status of gateway, current active configuration, html graphs for monitoring.

In one embodiment, there may be 3 configuration XML files for logical, physical and filters configuration respectively. These files are illustrated below in the form of XML code.

WebGatewayLogical XML

In one embodiment, logical configuration may start with a root host (e.g., WGRootHost). It may serve different target hosts based on specified key's value such as cgi, icgi (intl cgi), myestore etc. Target host may be virtual or logical. Virtual host may route to a different set of virtual/logical target hosts based on different values of a routing field (henceforth referred as "key"), target virtual hosts further map to yet another set of virtual/logical target hosts based on different values of yet another key. These cascaded lookups may finally resolve to a logical host.

For example, in the XML below element WGRootHost for the key "pool" and value "cgi" maps to target virtual host "CgiCoreVirtualHost". Virtual host "CgiCoreVirtualHost" for routing field "command=ViewItem" maps to virtual host "ViewItemCoreVirtualHost". Virtual host "ViewItemCoreVirtualHost" for routing field "itemHostId=5" maps to logical host "ViewItemCoreLogicalHost.ItemHost5".

```
<WebGatewayLogical>
    <WGRootHost key="pool">
        <!-- Example for affinity based routing -->
        <!-- cgi (core, intl) -->
        <target value="cgi" type="virtual" host="CgiCoreVirtualHost"/>
        <target value="cgi-intl" type="virtual" host="CgiIntlVirtualHost"/>
        <!-- intl (core, intl) -->
        <target value="my" type="virtual"
host="MyEstoreCoreVirtualHost"/>
        <target value="my-intl" type="virtual"
host="MyEstoreIntlVirtualHost"/>
        <!-- Example for shortest path routing -->
        <!-- scgi (core, intl) -->
        <target value="scgi" type="virtual" host="ScgiCoreVirtualHost"/>
        <target value="scgi-intl" type="virtual"
host="ScgiIntlVirtualHost"/>
        <!-- scgi (core) -->
        <target value="search" type="virtual"
host="SearchCoreVirtualHost"/>
        <!-- Example for direct logical pool entry, if required -->
```

```
        <target value="foo" type="logical" host="FooCoreLogicalHost"/>
    </WGRootHost>
    <!-- ViewItem -->
    <CgiCoreVirtualHost key="command">
        <target value="ViewItem" type="virtual"
host="ViewItemCoreVirtualHost"/>
    </CgiCoreVirtualHost>
    <ViewItemCoreVirtualHost key="itemHostId">
        <target value="5" source="field" type="logical"
host="ViewItemCoreLogicalHost.ItemHost5"/>
        <target value="6" source="field" type="logical"
host="ViewItemCoreLogicalHost.ItemHost6"/>
    </ViewItemCoreVirtualHost>
    <CgiIntlVirtualHost key="command">
        <target value="ViewItem" type="virtual"
host="ViewItemIntlVirtualHost"/>
    </CgiIntlVirtualHost>
    <ViewItemIntlVirtualHost key="itemHostId">
        <target value="5" source="field" type="logical"
host="ViewItemIntlLogicalHost.ItemHost5"/>
        <target value="6" source="field" type="logical"
host="ViewItemIntlLogicalHost.ItemHost6"/>
    </ViewItemIntlVirtualHost>
    <!-- MyEstore -->
    <MyEstoreCoreVirtualHost key="command">
        <target value="MyEstore" type="virtual"
host="MyEstoreCmdCoreVirtualHost"/>
    </MyEstoreCoreVirtualHost>
    <MyEstoreCmdCoreVirtualHost key="userHostId" source="cookie">
        <target value="9" type="logical"
host="MyEstoreCoreLogicalHost.UserHost9"/>
        <target value="10" type="logical"
host="MyEstoreCoreLogicalHost.UserHost10"/>
    </MyEstoreCmdCoreVirtualHost>
    <MyEstoreIntlVirtualHost key="command">
        <target value="MyEstore" type="virtual"
host="MyEstoreCmdIntlVirtualHost"/>
    </MyEstoreIntlVirtualHost>
    <MyEstoreCmdIntlVirtualHost key="userHostId" source="cookie" >
        <target value="9" type="logical"
host="MyEstoreIntlLogicalHost.UserHost9"/>
        <target value="10" type="logical"
host="MyEstoreIntlLogicalHost.UserHost10"/>
    </MyEstoreCmdIntlVirtualHost>
    <!-- V3Registration -->
    <ScgiCoreVirtualHost key="command">
        <target
value="RegisterEnterInfo|ChooseUserIdAndPassword|RegisterConfirmEmail"
type="logical" host="V3RegistrationCoreLogicalHost"/>
    </ScgiCoreVirtualHost>
</WebGatewayLogical>
```

Data Structure

In one embodiment, a single hash map may be sufficient to lookup the target host mapping using a key that is combination of virtual host name and key value.

Hash map, say LogicalConfigMap (key: Virtual Host Name+Key's Value, value: struct LogicalConfig) to store mapping.

LogicalConfig struct may store following fields: Target host name; Type; Target key; and Source of target key WebGatewayPhysical XML In one embodiment, physical configuration may map a logical host to the corresponding destination physical active and fail over host(s) in various data centers.

There are 3 types of mapping "affinity", "shortest" and "override" (already discussed in previous sections).

```
<WebGatewayPhysical>
<DataCenters>
    <den>
        <nearest>
            <phx order="1"/>
            <sjc order="2"/>
        </nearest>
    </sjc>
    <phx>
        <nearest>
            <den order="1"/>
            <sjc order="2"/>
        </nearest>
    </sjc>
</DataCenters>
<Hosts>
    <Host name="ViewItemCoreLogicalHost.ItemHost5" type="affinity">
        <PhysicalHost name="v3ViewItem.smf" location="smf"
type="active"/>
        <PhysicalHost name="v3ViewItem.sjc" location="sjc"
type="failover"/>
    </Host>
    <Host name="ViewItemIntlLogicalHost.ItemHost5" type="affinity">
        <PhysicalHost name="v3ViewItem.intl.smf" location="smf"
type="active"/>
        <PhysicalHost name="v3ViewItem.intl.sjc" location="sjc"
type="failover"/>
    </Host>
    <Host name="MyEstoreCoreLogicalHost.UserHost9" type="affinity">
        <PhysicalHost name="v3MyEstore.smf" location="smf"
type="active"/>
        <PhysicalHost name="v3MyEstore.sjc" location="sjc"
type="failover"/>
    </Host>
    <Host name="MyEstoreIntlLogicalHost.UserHost9" type="affinity">
        <PhysicalHost name="v3MyEstore.intl.smf" location="smf"
type="active"/>
        <PhysicalHost name="v3MyEstore.intl.sjc" location="sjc"
type="failover"/>
    </Host>
    <Host name="V3RegistrationCoreLogicalHost" type="shortest">
        <PhysicalHost name="v3Registration.smf" location="smf"
type="active"/>
        <PhysicalHost name="v3Registration.sjc" location="sjc"
type="failover"/>
    </Host>
    <Host name="FooCoreLogicalHost" type="override">
        <PhysicalHost name="v3Foo.smf" location="smf" type="active"
percent="70"/>
        <PhysicalHost name="v3Foo.sjc" location="sjc" type="active"
percent="30"/>
    </Host>
</Hosts>
</WebGatewayPhysical>
```

Data Structure

In one embodiment, a single hash map may be sufficient to look up logical host mapping using logical host name as key.

Hash map, say PhysicalConfigMap (key: Logical host name, value: struct PhysicalConfig), to store mapping.

Struct PhysicalConfig may store following fields: Type of mapping and Array of Active Physical VIPs. In one embodiment, array struct ActiveVIP. ActiveVIP struct may store following fields: (For type=shortest, it will be sorted by location nearest to the data center of the Gateway): VIP name, Location (Percent).

WebGatewayFilters XML

In one embodiment, filters configuration may specify the action for different key and its value combination. This configuration may be bit free style and the key could be any. Hence, configuration may also specify the order to evaluate keys. The look up order, for the keys, may be as specified.

```
<WebGatewayFilters>
    <Filters>
        <Keys> <!-- In the order of evaluation -->
```

```
        <command/>
        <pool/>
      <Keys/>
      <Filter key="command" value="foo" action="reject"/>
      <Filter key="pool" value="cgi6" action="route"
      vip="V3SignInCore.vip">
        <key="command" value="foo1"/>
      </Filter>
    </Filters>
  </WebGatewayFilters>
```

Data Structure

In one embodiment, a single hash map may be sufficient to lookup the mapping using a key that is combination of key name and key value.

Hash map, say FilterMap (key: Key name+Key value, value: struct Filter), to store mapping.

Struct Filter may store following fields:Action; VIP; Array of Keys (other than primary key); and Array of Values.

Configuration Manager will poll these configuration files from "Configuration File Repository". There will be a configuration map file in repository that will mention path where the configuration XML files are located for a gateway machine name. Poller needs to first get this file to get the path to the configuration files.

In various embodiments, polling may be set up in following 3 ways: 1) Using a new thread in Apache HttpServer—If a new thread may be created in Apache HttpServer during initialization time. It may be used as poller; 2) Using a perl script—A perl script may be written to poll files. It may store files on disk and call a URL dedicated for configuration manager (Need to support this URL on Apache). Script may be started as unix cron job. 3) Using a daemon—A daemon, written in C, may be written to poll files and do same as 2.

Figure 22:
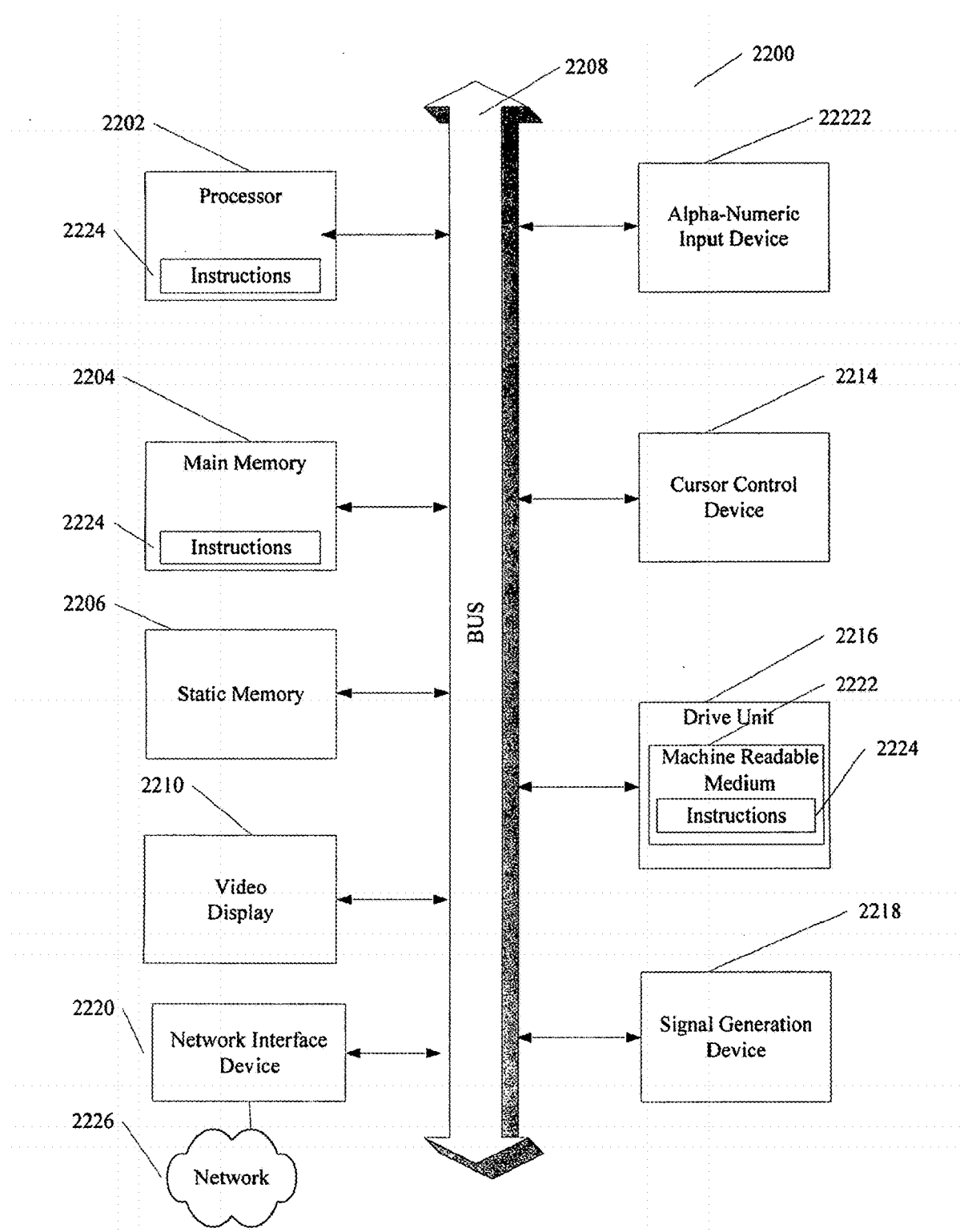
FIG. 22 is a block diagram diagrammatic representation of machine in the example form of a computer system within which a set of instructions, for causing the machine to perform any one or more of the methodologies discussed herein, may be executed.

FIG. 22 illustrates a diagrammatic representation of machine in the example form of a computer system 2200 within which a set of instructions may be executed to cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2200 includes a processor 2202 (e.g., a central processing unit (CPU), a graphics processing unit (GPU), or both), a main memory 2204 and a static memory 2206, which communicate with each other via a bus 2208. The computer system 2200 may further include a video display unit 2210 (e.g., a liquid crystal display (LCD) or a cathode ray tube (CRT)). The computer system 2200 also includes an alphanumeric input device 2212 (e.g., a keyboard), a cursor control device 2214 (e.g., a mouse), a storage unit 2216 (e.g., hard-disk drive), a signal generation device 2218 (e.g., a speaker) and a network interface device 2220.

The storage unit 2216 includes a machine-readable medium 2222 on which is stored one or more sets of instructions (e.g., software 2224) embodying any one or more of the methodologies or functions described herein. The software 2224 may also reside, completely or at least partially, within the main memory 2204 and/or within the processor 2202 during execution thereof by the computer system 2200, the main memory 2204 and the processor 2202 also constituting machine-readable media. The software 2224 may further be transmitted or received over a network 2226 via the network interface device 2220.

While the machine-readable medium 2222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

We claim:

1. A method, including:
   receiving network traffic from a plurality of external-facing load balancers at a gateway of a distributed network application, the distributed network application including the plurality of external-facing load balancers, a plurality of gateways including the gateway, a plurality of internal-facing load balancers, a plurality of application servers, and a plurality of databases, the plurality of gateways located between the plurality of external-facing load balancers and the plurality internal-facing load balancers, the network traffic including one or more data requests;
   inspecting, using one or more hardware processors of the gateway, a data request of the one or more data requests to determine a context of the data request;
   routing, based on the context of the data request corresponding to data stored at a database of the plurality of databases, the data request from the gateway to a first internal-facing load balancer of the plurality of internal-facing load balancers associated with a first application server of the plurality of application servers having a closest geographic proximity to the database; and
   routing, based on the context of the data request not corresponding to data stored at any database of the plurality of databases, the data request from the gateway to a second internal-facing load balancer of the plurality of load balancers associated with a second application server of the plurality of application servers having a closest geographic proximity to the gateway.

2. The method according to claim 1, further including rewriting the data request prior to the routing of the data request using an optimization algorithm to create an optimized search pattern based on contents of the data request.

3. The method according to claim 1, further including selecting the gateway to handle the network traffic based on a current load of each of the plurality of gateways.

4. The method according to claim 1, further including using a configuration file having information pertaining to the routing of the data request.

5. The method according to claim 4, further including checking for a new configuration file by periodically polling a configurator coupled to a configuration database storing one or more configuration files.

6. The method according to claim 1, further including:
mapping a user host identification associated with the data request to the first application server; and
identifying the first application server using the user host identification.

7. The method according to claim 1, further including routing the network traffic from the plurality of external-facing load balancers to the gateway based on a geographic location of an origin of the network traffic.

8. A method, including:
receiving network traffic from a plurality of external-facing load balancers at a gateway of a distributed network application, the distributed network application including the plurality of external-facing load balancers, a plurality of gateways including the gateway, a plurality of internal-facing load balancers, a plurality of application servers, and a plurality of databases, the plurality of gateways located between the plurality of external-facing load balancers and the plurality of internal-facing load balancers, the network traffic including one or more uniform resource locators (URLs);
parsing, using one or more hardware processors of the gateway, a URL of the one or more URLs to determine a context of a data request associated with the URL;
routing, based on the context of the data request corresponding to data stored at a database of the plurality of databases, the data request from the gateway to a first internal-facing load balancer of the plurality of internal-facing load balancers associated with a first application server of the plurality of application servers having a closest geographic proximity to the database; and
routing, based on the context of the data request not corresponding to data stored at any database of the plurality of databases, the data request from the gateway to a second internal-facing load balancer of the plurality of internal-facing load balancers associated with a second application server of the plurality of application servers having a closest geographic proximity to the gateway.

9. A system, comprising:
one or more processors;
memory including instructions that, when executed by the one or more processors, cause the system to:
receive network traffic from a plurality of external-facing load balancers at a gateway of a distributed network application, the distributed network application including the plurality of external-facing load balancers, a plurality of gateways including the system, a plurality of internal-facing load balancers, a plurality of application servers, and a plurality of databases, the plurality of gateways located between the plurality of external-facing load balancers and the plurality of internal-facing load balancers, the network traffic including one or more data requests;
inspect a data request of the one or more data requests to determine a context of the data request;
route, based on the context of the data request corresponding to data stored at a database of the plurality of databases, the data request to a first internal-facing load balancer of the plurality of internal-facing load balancers associated with a first application server of the plurality of application servers having a closest geographic proximity to the database; and
route, based on the context of the data request not corresponding to data stored at any database of the plurality of databases, the data request to a second internal-facing load balancer of the plurality of load balancers associated with a second application server of the plurality of application servers having a closest geographic proximity to the system.

10. The system according to claim 9, wherein the instructions when executed further cause the system to rewrite the data request prior to the routing of the data request using an optimization algorithm to create an optimized search pattern based on contents of the data request.

11. The system according to claim 9, wherein the instructions when executed further cause the system to select the system to handle the network traffic based on a current load of each of the plurality of gateways.

12. The system according to claim 9, wherein the instructions when executed further cause the system to use a configuration file that includes information pertaining to the routing of the data request.

13. The system according to claim 12, wherein the instructions when executed further cause the system to check for a new configuration file by periodically polling a configurator coupled to a configuration database storing one or more configuration files.

14. The system according to claim 9, wherein the instructions when executed further cause the system to:
map a user host identification associated with the data request to the first application server; and
identify the first application server using the user host identification.

15. The system according to claim 9, wherein the instructions when executed further cause the system to route the network traffic from the plurality of external-facing load balancers to the gateway based on a geographic location of an origin of the network traffic.

16. A non-transitory machine-readable storage medium embodying instructions that, when executed by one or more processors, cause the one or more processors to perform operations comprising:
receiving network traffic from a plurality of external-facing load balancers at a gateway of a distributed network application, the distributed network application including the plurality of external-facing load balancers, a plurality of gateways including the gateway, a plurality of internal-facing load balancers, a plurality of application servers, and a plurality of databases, the plurality of gateways located between the plurality of external-facing load balancers and the plurality of internal-facing load balancers, the network traffic including one or more data requests;
inspecting a data request of the one or more data requests to determine a context of the data request;
routing, based on the context of the data request corresponding to data stored at a database of the plurality of databases, the data request from the gateway to a first internal-facing load balancer of the plurality of internal-facing load balancers associated with a first application server of the plurality of application servers having a closest geographic proximity to the database; and routing, based on the context of the data request not corresponding to data stored at any database of the plurality of databases, the data request from the gateway to a second internal-facing load balancer of the plurality of load balancers associated with a second application server of the plurality of application servers having a closest geographic proximity to the gateway.

17. The non-transitory machine-readable storage medium according to claim 16, the operations further including rewriting the data request prior to the routing of the data request using an optimization algorithm to create an optimized search pattern based on contents of the data request.

18. The non-transitory machine-readable storage medium according to claim 16, the operations further including using a configuration file having information pertaining to the routing of the data request.

19. The non-transitory machine-readable storage medium according to claim 18, the operations further including checking for a new configuration file by periodically polling a configurator coupled to a configuration database storing one or more configuration files.

20. The non-transitory machine-readable storage medium according to claim 16, the operations further including:

mapping a user host identification associated with the data request to the first application server; and identifying the first application server using the user host identification.

* * * * *